US012761989B2

(12) United States Patent
Beard et al.

(10) Patent No.: US 12,761,989 B2
(45) Date of Patent: Oct. 13, 2026

(54) MESSAGE CHANNELS

(71) Applicant: Arm Limited, Cambridge (GB)

(72) Inventors: Jonathan Curtis Beard, Austin, TX (US); Steven Douglas Krueger, Austin, TX (US)

(73) Assignee: Arm Limited, Cambridge (GB)

( * ) Notice: Subject to any disclaimer, the term of this patent is extended or adjusted under 35 U.S.C. 154(b) by 526 days.

(21) Appl. No.: 18/446,570

(22) Filed: Aug. 9, 2023

(65) Prior Publication Data

US 2025/0053465 A1 Feb. 13, 2025

(51) Int. Cl.
*G06F 9/54* (2006.01)
*G06F 15/80* (2006.01)

(52) U.S. Cl.
CPC .............. *G06F 9/546* (2013.01); *G06F 9/544* (2013.01); *G06F 15/80* (2013.01); *G06F 2209/547* (2013.01)

(58) Field of Classification Search
CPC ...... G06F 9/546; G06F 9/544; G06F 9/30087; G06F 15/80; G06F 15/173; G06F 15/167; G06F 2209/547
USPC .......................................................... 719/313
See application file for complete search history.

(56) References Cited

U.S. PATENT DOCUMENTS 10,423,446 B2 9/2019 Dunham et al.
10,474,575 B2 11/2019 Beard et al.
10,552,212 B2 2/2020 Dunham et al.
10,620,954 B2 4/2020 Beard et al.
10,901,691 B2 1/2021 Schuttenberg et al.
11,445,020 B2 9/2022 Beard et al.
11,614,985 B2 3/2023 Chadwick et al.
2002/0071386 A1* 6/2002 Gronke .................. H04L 45/76 370/217
2003/0016686 A1* 1/2003 Wynne .................. H04L 49/255 370/389

(Continued)

FOREIGN PATENT DOCUMENTS

WO 2022/214777 10/2022

OTHER PUBLICATIONS

International Search Report and Written Opinion of the International Searching Authority for PCT/GB2024/051788 mailed Oct. 21, 2024, 19 pages.

(Continued)

*Primary Examiner* — Tuan C Dao
(74) *Attorney, Agent, or Firm* — NIXON & VANDERHYE P.C.

(57) ABSTRACT

A message channel functionality for a data processing system is disclosed. This provides communication channels which may be considered to be a shared resource. The approach combines atomic stores, which are fully completed in a single atomic transaction, and non-coherence to provide non-coherent atomic stores that are conditional to implement primitive communications channels that can be used to implement software queues and channels more efficiently. This enables the programmer to execute a store from registers on one side of a communications link and to have that data appear in the registers of a data consumer on that link directly, bypassing both the shared state upgrade problem and the parallel problem of acquiring a synchronization lock before data send.

23 Claims, 18 Drawing Sheets

(56) References Cited

U.S. PATENT DOCUMENTS

| | | | | |
|---|---|---|---|---|
| 2003/0051100 | A1* | 3/2003 | Patel | G06F 16/9574 711/108 |
| 2003/0069973 | A1* | 4/2003 | Ganesan | H04L 63/0227 709/246 |
| 2003/0086140 | A1* | 5/2003 | Thomas | H04Q 11/0067 348/E7.07 |
| 2003/0121051 | A1* | 6/2003 | Howe | H04N 21/25808 348/E7.071 |
| 2003/0187741 | A1* | 10/2003 | Brown | G06Q 30/0273 705/14.69 |
| 2004/0078799 | A1* | 4/2004 | Koning | G06F 9/5077 719/313 |
| 2004/0109434 | A1* | 6/2004 | Hwang | H04B 7/2646 370/345 |
| 2004/0205332 | A1* | 10/2004 | Bouchard | H04L 63/164 713/153 |
| 2006/0098022 | A1* | 5/2006 | Andrews | G06T 15/005 345/557 |
| 2006/0174040 | A1* | 8/2006 | Check | G06F 13/36 710/29 |
| 2008/0097959 | A1* | 4/2008 | Chen | G06F 16/8373 |
| 2009/0193164 | A1 | 7/2009 | Ajanovic et al. | |
| 2011/0197033 | A1* | 8/2011 | Wadhawan | G06F 12/0835 711/146 |
| 2013/0054728 | A1* | 2/2013 | Amir | H04N 21/2183 709/213 |
| 2013/0136188 | A1* | 5/2013 | Kumar | H04N 19/436 375/E7.026 |
| 2016/0344629 | A1* | 11/2016 | Gray | H04L 49/106 |
| 2017/0091003 | A1 | 3/2017 | Das Sharma et al. | |
| 2017/0371792 | A1* | 12/2017 | Oportus Valenzuela | G06F 12/0802 |
| 2018/0293169 | A1* | 10/2018 | Beard | G06F 12/1054 |
| 2022/0197726 | A1 | 6/2022 | Beckmann et al. | |
| 2022/0327009 | A1 | 10/2022 | Beard et al. | |
| 2022/0327057 | A1 | 10/2022 | Beard et al. | |

OTHER PUBLICATIONS

S. Tarkoma, "Publish/Subscribe Systems—Design and Principles" 1st Edition, Aug. 13, 2012, pp. 44-147,90 pages.

"Arm Architecture Reference Manual", Armv8, for Armv8-A architecture profile, ARM, 2013-2021, 8538 pages, https://developer.arm.com/documentation/ddi0487/ga.

"Concurrency Freaks", A web site dedicated to Concurrent algorithms and patterns, Nov. 27, 2016, 7 pages, http://concurrencyfreaks.blogspot.com/2016/11/faaarrayqueue-mpmc-lock-free-queue-part.html.

Sanghoon Lee, et al., "HAQu: Hardware-Accelerated Queueing for Fine-Grained Threading on a Chip Multiprocessor", 2011 IEEE 17th International Symposium on High Performance Computer Architecture. IEEE, 2011, 12 pages.

"The MCS Lock", Sep. 26, 2017, 3 pages, https://mfukar.github.io/2017/09/26/mcs.html.

Mpeng Wang, et al. "CAF: Core to core communication acceleration framework", 2016 International Conference on Parallel Architecture and Compilation Techniques (PACT), IEEE, 2016, 12 pages.

Qinzhe Wu, et al., "Virtual-Link: A Scalable Multi-Producer Multi-Consumer Message Queue Architecture for Cross-Core Communication", 2021 IEEE International Parallel and Distributed Processing Symposium (IPDPS), IEEE, 2021, 11 pages.

* cited by examiner

| MESSAGE CHANNEL ID. | SUBSCRIBED CONSUMER | TARGET POINTER |
|---|---|---|
| A | X | PTR_X |
| B | X | PTR_X |
| B | Y | PTR_Y |
| B | Z | PTR_Z |
| | | |
| | | |
| | | |
| | | |

MESSAGE CHANNELS

TECHNICAL FIELD

The present disclosure relates to data processing. In particular, the present disclosure relates to data processing systems comprising multiple processing elements which need to communicate with one another.

DESCRIPTION

In data processing systems comprising multiple processing elements, the need commonly arises for those multiple processing elements to communicate with one another. This need may arise for a great variety of reasons, but when multiple processing elements are each capable of carrying out data processing operations, a data processing system comprising those multiple processing elements can benefit from the combined data processing abilities of the multiple processing elements when they can communicate with one another, that is signal to one another and pass data to one another. The multiple processing elements may themselves either be a homogeneous set of essentially identical components or alternatively may represent a heterogeneous collection of components, each configured to perform particular types of tasks.

A number of different approaches to supporting such communication have been previously used, such as software queues (all types), provision of a device-driven queueing management engine (e.g., Intel's Dynamic Load Balancing Engine), ASIC-driven queueing solutions, and atomic operations. The predominant mechanism of communicating between two processing elements (PE) is to utilize a software queue. Such software queues can take the form of ring-buffers with atomic pointers, various linked-list formulations (both singly and doubly linked) which utilize compare-and-swap operations, and even combinations of these that use both ring-buffers and linked-list structures to overcome certain limitations of both (e.g., Ramalhete's queue formulation). Each of these queues suffers from significant scalability bottlenecks on coherent systems. These bottlenecks arise because in order to engage the control structures of the queue each thread of execution on each PE must gain ownership of individual coherence units which form the control structure. Gaining ownership of each of these coherence units involves multiple bus transactions to invalidate and retrieve the sole unique copy (which is a common trait to most coherence buses). The most general current solution to address these bottlenecks is to use far-atomic operations, yet further issues arise in implementing far-atomics, such as: when to execute far; where to execute; when to allow the data to be brought local; and what state should be supported to enable the sharing of data (e.g., if the data is brought local, whether it be in a shared state or unique only).

SUMMARY

In one example embodiment described herein there is a data processing system comprising:

- a system privileged agent arranged to define a configuration of the data processing system;
- multiple processing elements arranged to perform data processing, wherein the multiple processing elements comprise a producer element and a consumer element; and
- interconnect circuitry arranged to couple the multiple processing elements with one another, wherein the data processing system supports a message channel functionality according to which:

- the system privileged agent is configured to define a message channel for communication between the producer element and a consumer element, the message channel being defined by a message channel identifier and a message channel target pointer, wherein the message channel target pointer indicates a non-cacheable target location associated with the consumer element;
- the producer element is configured to perform an atomic message store operation with respect to a block of message data targeting the consumer element, wherein the producer element specifies the message channel identifier and the block of message data; and
- the interconnect circuitry is configured to convey the block of message data atomically to the non-cacheable target location associated with the consumer element.

In one example embodiment described herein there is a method of operating a data processing system comprising:

- defining a configuration of the data processing system by a system privileged agent;
- performing data processing in multiple processing elements, wherein the multiple processing elements comprise a producer element and a consumer element;
- coupling the multiple processing elements with one another via interconnect circuitry;
- defining a message channel for communication between the producer element and a consumer element, the message channel being defined by a message channel identifier and a message channel target pointer, wherein the message channel target pointer indicates a non-cacheable target location associated with the consumer element;
- performing an atomic message store operation by the producer element with respect to a block of message data targeting the consumer element, wherein the producer element specifies the message channel identifier and the block of message data; and
- conveying the block of message data atomically to the non-cacheable target location associated with the consumer element via the interconnect circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
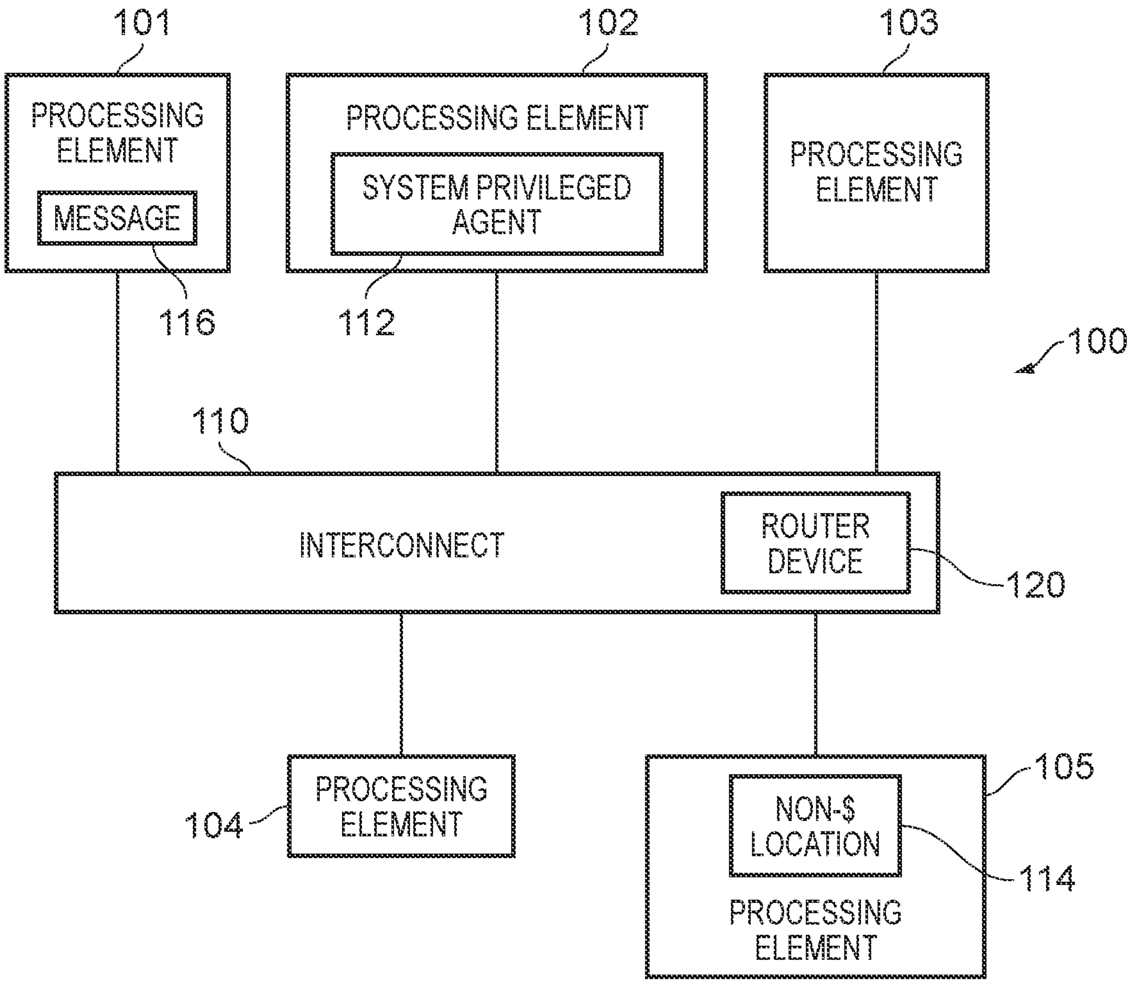
FIG. 1 schematically illustrates a data processing system in accordance with some examples.

Before discussing the embodiments with reference to the accompanying figures, the following description of embodiments is provided.

In accordance with one example configuration there is provided a data processing system comprising:

- a system privileged agent arranged to define a configuration of the data processing system;
- multiple processing elements arranged to perform data processing, wherein the multiple processing elements comprise a producer element and a consumer element; and
- interconnect circuitry arranged to couple the multiple processing elements with one another,
- wherein the data processing system supports a message channel functionality according to which:
- the system privileged agent is configured to define a message channel for communication between the producer element and a consumer element, the message channel being defined by a message channel identifier and a message channel target pointer, wherein the message channel target pointer indicates a non-cacheable target location associated with the consumer element;
- the producer element is configured to perform an atomic message store operation with respect to a block of message data targeting the consumer element, wherein the producer element specifies the message channel identifier and the block of message data; and
- the interconnect circuitry is configured to convey the block of message data atomically to the non-cacheable target location associated with the consumer element.

The present techniques are based on an approach which, instead of seeking to address the problem of acquiring shared state, instead provides a communication channel which may be considered to be a shared resource. This approach makes use of the concept of an atomic store (that is, that the store will be fully completed in a single atomic transaction), and the concept of non-coherence (which most common coherent buses implement) to use non-coherent atomic stores that are conditional to implement primitive communications channels that can be used to implement software queues and channels more efficiently. In short this enables the programmer to execute a store from registers on one side of a communications link and to have that data appear in the registers of a data consumer on that link directly, bypassing both the shared state upgrade problem and the parallel problem of acquiring a synchronization lock before data send. A system privileged agent (e.g. part of the operating system or a hypervisor) defines the configuration of the components participating in the message channel functionality and provision the ability of system software and user-space to then make use of message channels. Once thus established a producer element, i.e. one of the processing elements which has message data to be conveyed, performs an atomic message store operation, specifying a message channel identifier and a block of message data to be conveyed. The interconnect circuitry is configured to convey the block of message data atomically to the non-cacheable target location associated with the consumer element.

There are a variety of ways in which the message channel for communication between a producer element and a consumer element may be physically established. In particular, the producer element and the consumer element may communicate via the interconnect circuitry without any other intermediate device. However, in some examples the data processing system further comprises:

a router device coupled to the interconnect circuitry and comprising an input port and an output port, wherein the system privileged agent is configured to define the message channel for communication between the producer element and a consumer element by:

providing the producer element with a message channel router pointer indicative of the input port of the router device; and storing message channel configuration data in the router, the message channel configuration data comprising the message channel identifier and the message channel target pointer, wherein the producer element is arranged to perform the atomic message store operation specifying the message channel router pointer, and wherein the router device is responsive to reception of the block of message data at the input port to forward the block of message data from the output port to the non-cacheable target location indicated by the message channel target pointer.

Accordingly, the communication between the producer element and the consumer element in such examples is provided in (at least) two stages, whereby the block of message data is initially conveyed from the producer element to the input port of the router device (as indicated by the message channel router pointer) and then subsequently the block of message data is forwarded by the router device from its output port to the non-cacheable target location indicated by the message channel target pointer.

It should be appreciated that the message channels which are established in the data processing system are not limited to providing one-to-one communication between a given producer element and a given consumer element. Instead, it should be appreciated that multiple processing elements may subscribe to given message channel, such that a block of message data which is put into a message channel by a producer element may be provided to just one consumer element or may be provided to more than one consumer element. For example, in some examples in which the data processing system further comprises a router device, the multiple processing elements comprise multiple consumer elements, and wherein more than one consumer elements subscribe to the message channel, wherein the message channel is associated with multiple message channel target pointers, wherein each of the message channel target pointers indicates a non-cacheable target location associated with a respective consumer element of the multiple consumer elements, and wherein the message channel configuration data stored in the router device comprises the message channel identifier and the multiple message channel target pointers. As such, depending on the configuration of the router device and the message channel, the block of message data may be forwarded to a selected one of the multiple consumer elements which subscribe to the message channel, may be forwarded to a subset of the multiple consumer elements which subscribe to the message channel, or may be forwarded to all of the multiple consumer elements which subscribe to the message channel.

In some examples, the router device is responsive to reception of the block of message data at the input port to select a recipient consumer element from the more than one consumer elements which subscribe to the message channel and to forward the block of message data from the output port to the non-cacheable target location indicated by the message channel target pointer associated with the recipient consumer element.

Such a selection of the recipient consumer element may occur in a variety of ways, but in some examples the router device is configured to select the recipient consumer element in dependence on recipient ordering data for the more than one consumer elements which subscribe to the message channel stored in the router device.

As mentioned, the block of message data may be distributed to more than one subscribing consumer element and thus in some examples the router device is further responsive to the reception of the block of message data at the input port to re-forward the block of message data from the output port to each of the more than one consumer elements which subscribe to the message channel.

Whilst the message channel functionality may be used to convey a range of sizes of blocks of message data, a message channel may also be used for communication, without explicit data being sent. Thus in examples the producer element is further configured to send a zero data message, wherein the zero data message specifies the message channel identifier and an identifier indicative of the zero data message data, and the router device is responsive to reception of a zero data message to forward the zero data message to one or more consumer elements which subscribe to the message channel. Hence, instead of the producer element specifying the message channel identifier and an explicit block of data to be conveyed, in such examples the producer element specifies the message channel identifier and an identifier indicative of the zero data message data, i.e. the “data identifier”, which may take a variety of forms (but generally need only be a short, unique identifier) has the particular meaning that no data is being transferred. Nonetheless the same message signalling takes place. Such zero-data messaging may then be used for a variety of signalling purposes.

There are some examples, wherein the multiple processing elements comprise multiple producer elements, and wherein more than one producer elements are configured to send the zero data message, and the router device is configured to maintain a count of a number of producer elements from which the zero data message has been received, and the router device is responsive to the count reaching a predetermined threshold value to forward the zero data message to one or more consumer elements which subscribe to the message channel. This mechanism can for example be used to allow multiple producer elements to synchronise with one consumer element.

The passing of messages via the message channels from a producer element to a consumer element via a router may also involve acknowledgments being returned and in some examples the consumer element is responsive to reception of the block of message data at the non-cacheable target location indicated by the message channel target pointer to return a success indicator to the router device, wherein the success indicator indicates whether or not the block of message data has been successfully received by the consumer element, and the router device is responsive to reception of the success indicator to forward the success indicator to the producer element.

The router device itself may also react to acknowledgments, and in particular may react to a negative acknowledgment (i.e. a “NACK” indicating that a message has not been received by the consumer element) and in some examples the router device is responsive to the reception of the success indicator from the consumer element, when the success indicator indicates that the block of message data has not been successfully received by the consumer element, to retry forwarding the block of message data.

Alternatively, or in addition, the router device may try a different destination for a given block of message data, and in some examples the multiple processing elements comprise multiple consumer elements, and wherein more than one consumer elements subscribe to the message channel, wherein the router device is responsive to the reception of the success indicator from the consumer element, when the success indicator indicates that the block of message data has not been successfully received by the consumer element, to retry forwarding the block of message data to another consumer element which subscribes to the message channel.

In some examples, the router device may itself generate message failure indications. For example, the router device is responsive to the reception of the block of message data at the input port, when no consumer element is available for the message channel, to return a message failure indication to the producer element.

The router device may determine that no consumer element is available in a variety of ways, but in some examples the router device is configured to maintain consumer element capacity data indicative of a capacity of the consumer element to receive message data, and when the consumer element capacity data indicates that the consumer element does not have capacity to receive the block of message data at the input port, the router device is arranged to return a message failure indication to the producer element.

In some examples, the router device comprises a message block buffer configured to store multiple blocks of message data, wherein the router device is configured to forward the multiple blocks of message data respecting an ordering defined by the message block buffer. In some examples the ordering is a first-in-first-out ordering.

In some examples the router device comprises a message block buffer configured to buffer a received block of message data and, when the message block buffer is not available to buffer the block of message data but will be available to buffer the block of message data after a known processing step, to return a fail-but-retry message to the producer element indicating that the block of message data will be receivable after the known processing step. For example, the producer element could receive a retry indicator, which indicates that a buffer will be reserved for a follow-on retry. This can be possible for the router device when it has no available buffer space in the cycle when the message is received, but due to deterministic behaviour of how the router device handles message blocks (and clears buffer entries) a prediction can be possible that buffer space will be available on the next cycle.

In some examples data processing system comprises:

a plurality of router devices coupled to the interconnect circuitry and each comprising an input port and an output port, wherein the system privileged agent is configured to define the message channel for communication between the producer element and a consumer element by concatenating the plurality of router devices, such that:

the message channel router pointer specified by the producer element specifies a first router device of the plurality of router devices, and the message channel configuration data stored in each of the plurality of router devices links the plurality of router devices in sequence, such that each router device of the plurality of router devices other than a last concatenated router device is responsive to reception of the block of message data at the input port to forward the block of message data from the output port to a next router device of the plurality of router devices, and the last concatenated router which is responsive to reception of the block of message data at the input port to forward the block of message data from the output port to the non-cacheable target location indicated by the message channel target pointer.

In some examples the router device further comprises an auxiliary interface providing a control access to the router device, wherein control signals received at the auxiliary interface provide at least partial control of operation of the router device.

In some examples the router device further comprises an auxiliary interface providing a control access to the router device, wherein control signals received at the auxiliary interface provide at least partial control of operation of the router device, wherein the at least partial control of operation of the router device comprises the selection of the recipient consumer element from the more than one consumer elements which subscribe to the message channel.

In some examples the router device further comprises a work queue buffer arranged to buffer multiple blocks of message data, wherein the multiple blocks of message data comprise task definitions of tasks to be carried out by the consumer element, and wherein the control signals received at the auxiliary interface control scheduling of the tasks to be carried out by the consumer element by selection from the multiple blocks of message data buffered in the work queue buffer.

In some examples the work queue buffer comprises multiple work queues, wherein the multiple work queues each has an associated priority level relative to each other, and wherein the control signals received at the auxiliary interface control scheduling of the tasks to be carried out by the consumer element respecting the relative associated priority levels of the multiple work queues.

As mentioned above, the zero data message sending using message channels may be used for a variety of signalling purposes. In some examples the producer element is further configured to send a zero data message, wherein the zero data message specifies the message channel identifier and an identifier indicative of the zero data message data, and wherein the multiple processing elements comprise multiple producer elements, and wherein more than one producer elements are configured to send the zero data message, and the router device further comprises producer element lock tracking storage and the router device is responsive to reception of the zero data message from a lock-seeking producer element to store an indication of the lock-seeking producer element in the producer element lock tracking storage, wherein the producer element lock tracking storage also stores a lock status indication indicative of whether a lock target is currently allocated to one of the multiple producer elements, wherein when the lock status indication is not set, the lock target is allocated to the lock-seeking producer element and the lock status indication is set, and when the lock status indication is set, the indication of the lock-seeking producer element is queued up in the producer element lock tracking storage.

The producer element lock tracking storage may be provided in a variety of ways, but in some examples the producer element lock tracking storage is configured as a shift register, wherein storing the indication of the lock-seeking producer element in the producer element lock tracking storage comprises shifting the indication of the lock-seeking producer element into the shift register, wherein when the lock status indication is set and the lock-allocated producer element to which the lock target is currently allocated sends the zero data message again, the router device is configured to pop an indication of the lock-allocated producer element from the shift register, and wherein when popping the indication of the lock-allocated producer element from the shift register reveals an indication of a further lock-seeking producer element, the router device is configured to send the zero data message to the further lock-seeking producer element indicating that the lock target is now allocated to the further lock-seeking producer element.

As mentioned above, the data processing system may be provided in a configuration with one or more router devices, but may also be provided in a router-less configuration. In some examples, the system privileged agent is configured to define a router-less message channel for communication between the producer element and a consumer element by providing the producer element with the message channel target pointer indicating the non-cacheable target location associated with the consumer element, wherein the producer element is arranged to perform the atomic message store operation specifying the message channel target pointer.

The consumer element may be configured to make use of a block of message data received at the non-cacheable target location in various ways, but in some examples the consumer element comprises a holding buffer accessible to user software executing on the consumer element, wherein the non-cacheable target location associated with the consumer element is configured as a data reception port of the consumer element, and wherein the data reception port is configured to forward the block of message data received atomically to the holding buffer.

The holding buffer may take a variety of forms but in some examples the holding buffer comprises at least one of:

a set of system registers;

vector registers; and user software addressable memory buffer.

In some examples the holding buffer is sub-divided into a plurality of sub-buffers, wherein each sub-buffer of the plurality of sub-buffers is allocated to a corresponding message channel to which the consumer element is subscribed.

In some examples the consumer element is configured to reserve at least a portion of the holding buffer for at least one prioritised message channel to which the consumer element is subscribed.

In some examples, the consumer element is responsive to an attempt to deliver the block of message data at the data reception port, to return a success indicator, wherein the success indicator indicates whether or not the holding buffer currently has capacity to receive the block of message data.

In some examples the user software executing on the consumer element is configured to test whether the holding buffer currently holds a user software targeted block of message data on a message channel to which the user software is subscribed.

In some examples the consumer element is configured to support execution of multiple tasks on the consumer element, wherein each task has an individual set of consumer element state and the consumer element is configured to switch to a corresponding individual set of consumer element state when switching to a current task of the multiple tasks.

In some examples the consumer element is responsive to an attempt to deliver the block of message data at the data reception port, to receive or reject the block of message data in dependence on whether current task is subscribed to the message channel for the block of message data.

In some examples the data reception port is responsive to an attempt to deliver the block of message data at the data reception port, when the current task is not subscribed to the message channel for the block of message data, to generate an interrupt signal for the consumer element.

In some examples the consumer element is configured to reference memory locations using virtual addresses and comprises address translation circuitry to perform address translation of the virtual addresses into physical addresses, wherein the consumer element is configured to map a virtual address associated with the message channel to a physical address associated with the holding buffer, and wherein the consumer element is configured to access the message channel by execution of a load instruction specifying the virtual address.

Moreover, the virtualisation approach can also be extended to the message channel identifiers to renumber the message channel identifiers to an enumeration used by the particular consumer software which is currently executing. Accordingly, in some examples the consumer element comprises message channel handling circuitry comprising the non-cacheable target location, wherein the message channel handling circuitry is configured to reference message channels using message channel identifiers, wherein user software executing on the consumer element is configured to reference the message channel using a virtual message channel identifier, and the consumer element comprises message channel identifier translation circuitry configured to translate virtual message channel identifiers to message channel identifiers in dependence on user software currently executing on the consumer element.

The blocks of message data are not limited in terms of their semantic content and therefore the message channels may be put to a great variety of uses in supporting communication between processing elements in the system. However, in some examples the consumer element is configured to receive task definitions via the message channel and the block of message data provides at least a part of a task definition for the consumer element. Thus a message channel may be used by a producer element to delegate processing tasks to a consumer element.

The provision of task data in this manner may be reacted to in various ways, but in some examples the consumer element is configured, when a currently executing task relinquishes use of the consumer element, and when a block of message data providing at least a part of a task definition for the consumer element has been received on the message channel, to switch to performing a new task defined by the task definition.

Various configurations may be supported for administering the manner in which the consumer element responds to received task definitions, in particular how the consumer element prioritises a received task definition against other tasks it is carrying out. In some examples the consumer element is configured, when a block of message data providing at least a part of a task definition for the consumer element is received on the message channel, to pause execution of a currently executing task and to switch to performing a new task defined by the task definition.

The virtualisation approach may also be applied at the producer element side and accordingly, in some examples the producer element is configured to reference memory locations using virtual addresses and comprises address translation circuitry to perform address translation of the virtual addresses into physical addresses, wherein the producer element is configured to map a virtual address associated with the message channel to a physical address associated with the message channel identifier, and wherein the producer element is configured to access the message channel by execution of a store instruction specifying the virtual address. This then provides an approach to the use of the message channel for the producer element which is advantageously integrated with its approach to interacting with the memory system, whereby pushing a message into a given message channel can be achieved by a store operation to a specified virtual address (which has been mapped to the message channel).

A variety of message store operations may be supported, but in some examples the execution of the store instruction comprises retrieval of the block of message data from a set of registers and storing the block of message data to the physical address associated with the message channel identifier.

In some examples the system privileged agent comprises at least one of:

an operating system; and a hypervisor.

In order to facilitate the use of the message channel functionality, the system privileged agent can provide a range of system calls that may be made by the processing elements in the system. In some examples the system privileged agent is responsive to a message channel setup call for the message channel from a processing element of the multiple processing elements to:

allocate the message channel identifier for the message channel;

specify the message channel target pointer;

wherein the processing element uses virtual addresses to reference memory locations, and allocate a virtual address for the processing element to use for the message channel, wherein the virtual address maps to a physical address given by the message channel target pointer.

Establishment of such system call possibilities may also incorporate the use of one or more router devices in the supporting infrastructure for the message channels and hence in some examples the system privileged agent is responsive to a message channel setup call for the message channel from a processing element of the multiple processing elements to:

allocate the message channel identifier for the message channel;

specify the message channel target pointer;

specify the message channel router pointer;

wherein the processing element uses virtual addresses to reference memory locations, and allocate a virtual address for the processing element to use for the message channel, wherein the virtual address maps to a physical address given by the message channel router pointer.

In some examples at least some of the physical address mappings employed may enable the physical address to encode the message channel identifier and hence simplify matching. Hence in some examples the system privileged agent is configured to define a virtual-to-physical address mapping scheme between a virtual address space and a physical address space in which a subset of bits of the physical address space are directly indicative of a set of message channel identifiers defined by the system privileged agent.

Context switching may be supported on at least one processing element in the system and the present techniques further propose that the processing element state which is switched in and out on a context switch also comprises at least one message channel identifier and corresponding message channel target pointer. Hence in some examples at least one processing element of the multiple processing elements is configured to support execution of multiple tasks on the processing element, wherein each task has an individual set of processing element state, wherein the system privileged agent is configured to administer time-sliced use of the processing element by causing an exchange of the individual set of processing element state and by modifying at least one of the message channel identifier and the message channel target pointer.

When multiple router devices are present the start-up process for the system may support a process administered by the system privileged agent defining the system configuration which takes the positioning of the router devices in the structure of the system into account when allocating message channels to router devices. Hence in some examples the data processing system comprises:

a plurality of router devices coupled to the interconnect circuitry, wherein at system start-up the system privileged agent is configured to map each of the plurality of router devices into a physical address space, and a proximity table is constructed comprising information indicative of a predefined cost function related to communication between each processing element of the multiple processing elements and each router device of the plurality of router device, wherein the system privileged agent is configured to define the message channel for communication between the producer element and a consumer element by:

selecting the router device associated with the message channel in dependence on the information comprised in the proximity table.

The allocation of router devices may make use of the information held in the proximity table in a variety of ways, but in some examples the router device is further selected to minimise a predefined cost function related to communication between the router device and the consumer element.

In some examples the predefined cost function is a measure of at least one of:

relative distance between the router device and the consumer element;

bandwidth between the router device and the consumer element; and/or signalling latency between the router device and the consumer element.

Other factors may also be taken into account and in some examples the router device is further selected in dependence on a relative priority of the message channel.

The proximity table may also be used and updated in a dynamic fashion, such as when a router device is added to or removed from the data processing system when it is operational. Hence in some examples the system privileged agent is responsive to addition of a new router device to the data processing system whilst the data processing system is operating to re-construct the proximity table to incorporate the new router device.

In accordance with one example configuration there is a method of operating a data processing system comprising:

- defining a configuration of the data processing system by a system privileged agent;
- performing data processing in multiple processing elements, wherein the multiple processing elements comprise a producer element and a consumer element;
- coupling the multiple processing elements with one another via interconnect circuitry;
- defining a message channel for communication between the producer element and a consumer element, the message channel being defined by a message channel identifier and a message channel target pointer, wherein the message channel target pointer indicates a non-cacheable target location associated with the consumer element;
- performing an atomic message store operation by the producer element with respect to a block of message data targeting the consumer element, wherein the producer element specifies the message channel identifier and the block of message data; and
- conveying the block of message data atomically to the non-cacheable target location associated with the consumer element via the interconnect circuitry.

Particular embodiments will now be described with reference to the figures.

FIG. 1 illustrates a data processing system 100 in accordance with one embodiment. The system comprises a number of processing elements 101-105, which are each coupled to interconnect circuitry 110. The processing elements are configured to individually perform data processing operations, but also to communicate with one another. In particular, one mechanism by which the processing elements can communicate with one another according to the present disclosure is by the provision of a message channel functionality, which is described in more detail in the following. The message channel functionality is established by a system privileged agent 112, which may for example form part of the operating system running on the processing element 102 or may be embodied as a hypervisor running on the processing element 102. In particular, the system privileged agent 112 defines one or more message channels, each characterised by a message channel identifier and a message channel target pointer. Relevant information concerning the definition of the one or more message channels is provided by the system privileged agent 112 to those processing elements in the system which require this information. Generally speaking, a producer element, that is to say a processing element which has message data to be conveyed to another processing element, is informed of one or more message channel identifier which it can use by the system privileged agent 112, where each message channel identifier is associated with a message channel target pointer, which indicates a non-cacheable target location 114 associated with a given consumer element 105. The producer element (e.g. processing element 101) is then able to performs an atomic message store operation with respect to a block of message data 116 and the interconnect circuitry 110 is configured to convey the block of message data 116 atomically to the non-cacheable target location 114 associated with the consumer element 105. Note that the data processing system 100 is shown to also comprise a router device 120, which in this example forms part of the interconnect circuitry 110. In the above-described example, the router device is not involved in the implementation of the message channel via which the processing element 101 passes the block of message data 116 to the non-cacheable location 114 of the consumer element 105. However, in other examples, and as will be described in more detail in the following, the system privileged agent 112 may also define message channels which make use of router devices such as the router device 120. In such examples the message store operation carried out by the processing element 101 will initially cause the block of message data 116 to be transferred to the router device 120 (specifically to an input port of the router device 120) and the router device 120 has a configuration (also initially set up by the system privileged agent 112) such that it will then cause the block of message data 116 to be transmitted (specifically from an output port of the router device 120) to the non-cacheable location 114 of the consumer element 105.

Before proceeding further with the description of various specific examples of the present techniques, the following table sets out a number of definitions of terms which may be used in the description of those examples:

| Term | Definition |
|---|---|
| Message Store Operation | Conditional store of message to a target. A single store operation which is "atomic". In one example using the Arm ISA the st64bXX family of instructions can be used. The message store is also non-coherent. This should not imply that the message store operation must be 64B and additional instructions can be provided to incorporate smaller message store operations such as 32B, 16B, etc. that would use fewer source architected registers and potentially smaller bus transactions. |
| Message Channel Identifier | Each message channel identifier is a unique name for a given message channel instance. This can be thought of as a single message channel object to which producers and consumers subscribe. |
| MCP | Message Channel Port: each message channel port may be virtualized, so that depending on the instance in time can be assigned (potentially via indirection) to a specific message channel identifier. |
| MCU | Message Channel Unit: where the count of contained MCPs is >=1. |
| ACPI | Advanced Configuration & Power Interface |
| ACPI SLIT | System Locality Information Table (as specified by ACPI) |
| ACPI SRAT | System Resource Affinity Table (as specified by ACPI) |
| ACPI HMAT | Heterogeneous Memory Attribute Table (as specified by ACPI) |
| NUMA | Non-Uniform Memory Architecture |
| NUCA | Non-Uniform Cache Architecture |
| Push operation | The act of sending/releasing data to a channel. Equivalent to a store + semantic of releasing data stored to downstream agent (e.g., transfers ownership). |
| Pop operation | The act of pulling/receiving data from a channel. Equivalent to a load + semantic of receiving data from upstream agent (e.g., transfers ownership). |
| Virtual address | Virtual representation of memory space seen by the application layer (e.g., EL0) |
| Physical address | Physical representation of memory space, this corresponds to a specific device or set of devices. |
| PE (processing element) | A PE could be general purpose core (e.g., an Arm A-class, R-class, M-class core) which contains a program counter address and is capable of loading instructions provided in |

-continued

| Term | Definition |
|---|---|
| | a specified instruction set architecture. A PE could also be an accelerator, device, or other compatible processing element of less programmable capability such as a GPU, DMA, NIC, NPU, or another known device. Here, targets could also be compatible storage devices communicating over protocols such as NVMe that are responsive to message store operations. |

Figure 2A:
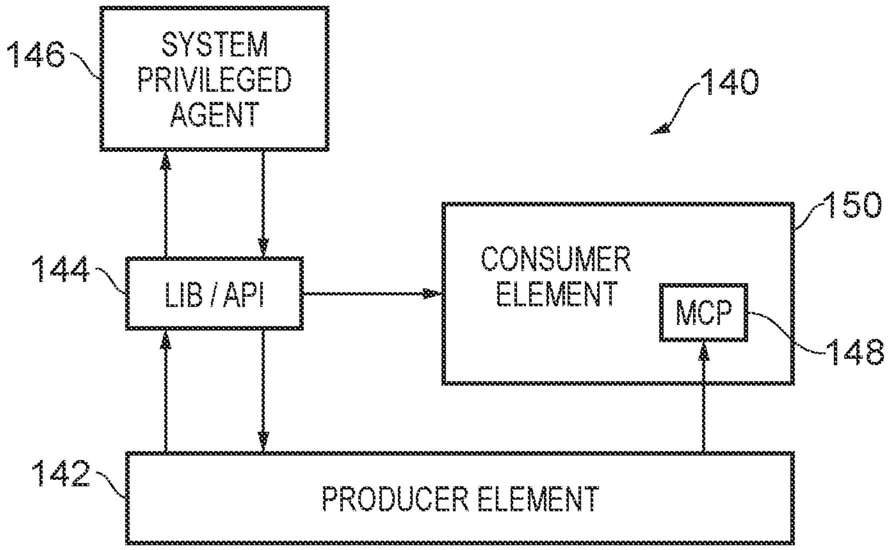
FIGS. 2A and 2B schematically respectively illustrate data processing systems without and with a router device in accordance with some examples.
Figure 2B:
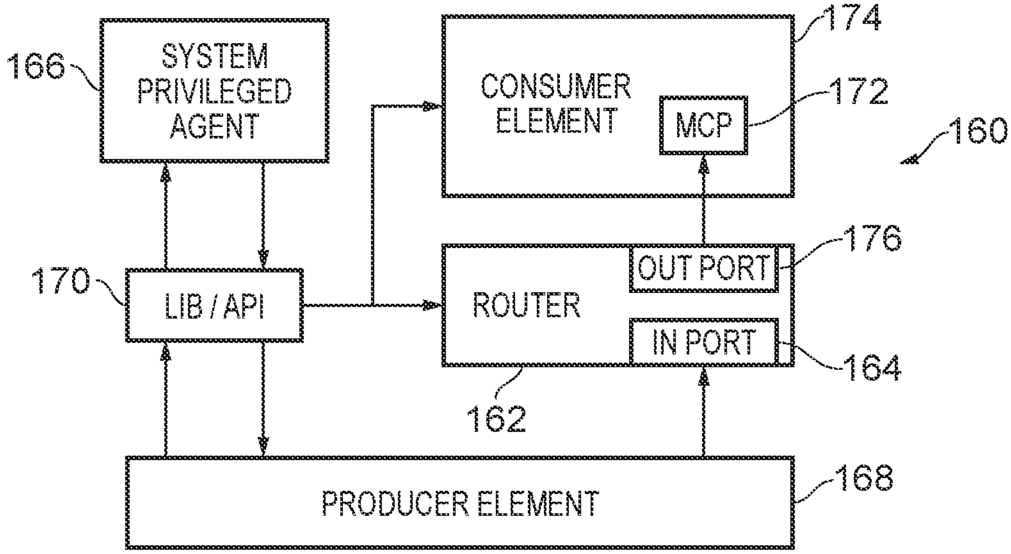

FIGS. 2A and 2B respectively show an example data processing system without a router and an example data processing system with a router device. Briefly, the data processing system 140 without a router provides a simpler and potentially faster system, although one in which the message channel topology is static and requires the producer element software to be explicitly provided with the target location. According to this arrangement the producer element 142 sends a request for a message channel to use via the library/API 144. The system privileged agent 146 (in this example the OS) sets up the message channel for use, returning the message channel handle (identifier) and a pointer indicative of the MCP 148 (in the consumer element 150). The producer element 142 then builds a message block in a set of (e.g. 8 contiguous 64B) general purpose registers. The producer element then causes the transfer by executing a store instruction (e.g. st64bv) directed by the pointer indicative of the MCP 148. The message block is then received atomically by the MCP 148. Software on the consumer element 150 either detects or is notified of the new message and reads the message from the MCP 148 and processes it. Hence a producer thread in this arrangement can use the message store operation to write to a virtual address that will directly target a consumer core. That VA will then only map to a single target.

The FIG. 2A arrangement may be compared to the data processing system 160 in FIG. 2B, which is similar but also includes a router 162. This adds some useful flexibility to the configuration for modest overhead, in particular allowing a dynamic topology where the producer element software does not need any knowledge of the actual target location and instead only makes use of the channel identifier and knowledge of the input port 164 of the router 162. The dynamism arises because even once the system is operational, the system privileged agent 166 (in this example the OS) can modify the message channel definitions on the consumer side, but providing the router 162 with an updated configuration. In operation, the producer element 168 sends a request for a message channel to use via the library/API 170. The system privileged agent 166 (here, the OS) sets up the message channel for use, returning the message channel handle (identifier) and a pointer indicative of the in port 164 of the router 162. The producer element 168 then builds a message block in a set of (e.g. 8 contiguous 64B) general purpose registers. The producer element 168 then causes the transfer by executing a store instruction (e.g. st64bv) directed by the pointer indicative of the in port 164, which receives the message block atomically. The system privileged agent 166 also sets up the router, providing a mapping of channel identifiers to target pointers, and thus for this particular message channel defines the target as the MCP 172 in the consumer element 174. Hence, having received the message block at its in port 164, the router then forwards the message block to be received atomically by the MCP 172. Software on the consumer element 174 either detects or is notified of the new message and reads the message from the MCP 172 and processes it.

Accordingly, when a user-level software agent (executing on a processing element) wants to use a channel, it will instantiate a queue from a software framework (e.g. Boost Lock-free Queue, Intel's Threading Building Blocks, etc.). In code this could be specified as follows:

```
#include <boost>
#include <cstdint>
boost::lockfree::queue< std::int64_t > queue( );
```

where the queue object is created (in this example) on the stack and the queue constructor is called on this stack-based memory location. When the constructor is called it then calls into the OS/hypervisor to obtain a message channel identifier. This message channel identifier is a unique (but virtualizable) identifier that enables differentiation of a single channel within the system. Further extensions of this can include using a ACPI SLIT (system locality information table), a SRAT, or other, e.g., HMAT table to specify locality and topology, so that the system can treat each channel as a NUMA resource (with varying locality to each PE, i.e., each physical channel could have an associated proximity domain).

The queue software constructor could look something like this (in abstract code format):

```
#include <boost>
#include <cstdint>
#include <cstdlib>
queue::queue( )
{
  const auto our_proc_id = getpid( );
  char channel_list_buffer[ MAX_PATH_LENGTH ];
  std::snprintf( channel_list_buffer /** null term **/,
     MAX_PATH_LENGTH,
     "/proc/%d/channel_list",
     our_proc_id );
  const auto queue_id = open( channel_list_buffer, OPEN_QUEUE_HANDLE );
  /** initialize producer/consumer addresses **/
  producer_address_ = mmap(      0,
                                 0,
                                 PROT_WRITE,
                                 MAP_QUEUE |
                                 MAP_PRIVATE /** only within single, ASID **/
                                 /** MAP_SHARED if cross-ASID, multi-process **/
                                 queue_id,
```

-continued

```
                    0 );
  if( producer__address__ == MAP__FAILED )
  {
    //check error codes, fall back to software queue if needed
  }
  consumer__address__ = mmap(     0,
                                  0,
                                  PROT__READ,
                                  MAP__QUEUE |
                                  MAP__PRIVATE /** only within single, ASID **/
                                  /** MAP__SHARED if cross-ASID, multi-process **/
                                  queue__id,
                                  0 );
  if( consumer__address__ == MAP__FAILED )
  {
    //check error codes, fall back to software queue if needed
  }
  //producer and consumer are now ready for push/pop operations
}
```

In the above example implementation there are several "system" calls that map into the underlying OS. As an example these could work as follows:

Open:

- Read inode indicated by input file path string;
- Open as a queue handle (specific implementations could open as RD or WR using the default O_RD/WR flags specified in POSIX or they could leave that to mmap to specify);
- At the specified inode, the OS allocates a channel identifier/handle for the given channel;
- Return is a file descriptor integer which maps to the identifier/handle. Note that this handle doesn't have to numerically match that which is the internal (and micro-architecturally visible) channel ID, it simply has to map to the one that the hardware will use within the OS for subsequent mmap call.

mmap:

- Reads inode represented by file descriptor integer provided;
- This file descriptor maps to the specific channel identifier used by the hardware;
- [As an implementation choice] the OS could read/use the HMAT/SLIT table information presented in sysfs to allocate the most local router to the caller.
- The OS allocates a virtual address page which maps to the Physical Address of register port on the router which is assigned to this particular channel. The router itself will use the physical channel port along with address information provided to decode which channel each message store operation maps to.
- The mmap command returns a valid virtual address to the physical channel port on the router. The mapping is good for read or write only (as a design choice), it could be either read or write but the example is shown given specific permissions.

Hence, the producer and consumer address are returned in the callee's virtual address (VA) space via mmap. To perform a push/pop operation, this VA is translated into a physical address. For the producer a message store operation is required and in some examples this is implemented by the above-mentioned st64 instruction and variants, although this mechanism may employ with any message store to non-cacheable memory. A separate message store operation variant could be used to provide control of the permission to access message channels from a given EL. For the consumer a message channel port address is defined which can be the target of message store operations (either from a router or from another PE directly). This port simply receives data and for example forwards it to a holding buffer for user-space consumption. Such a holding area could be a (set of) special purpose system register(s) (e.g., a bank of 64B system registers with associated instructions for user-space to consume this data, which could be an existing Arm ISA ld64 operation if the 64B system register is exposed to the software as a device memory address to read from). This holding area could also be vector registers (e.g., from the SVE instruction set) or other register set with sufficient width. This holding area could also be of many other forms (including any addressable memory buffer with sufficient space), e.g., it is abstracted from the architecture. In one example implementation, the consumer software can map a consumer channel as previously described, and use a load instruction such as ld64 to access the channel. Each load is translated as normal through address generation and the PA is then used when accessing the MCU and translated (potentially using the same mapping mechanism described previously for producers) to access a channel. The channel access could occur within the core or outside of the core. Data is returned to registers (if using ld64).

Figures 3A, 3B:
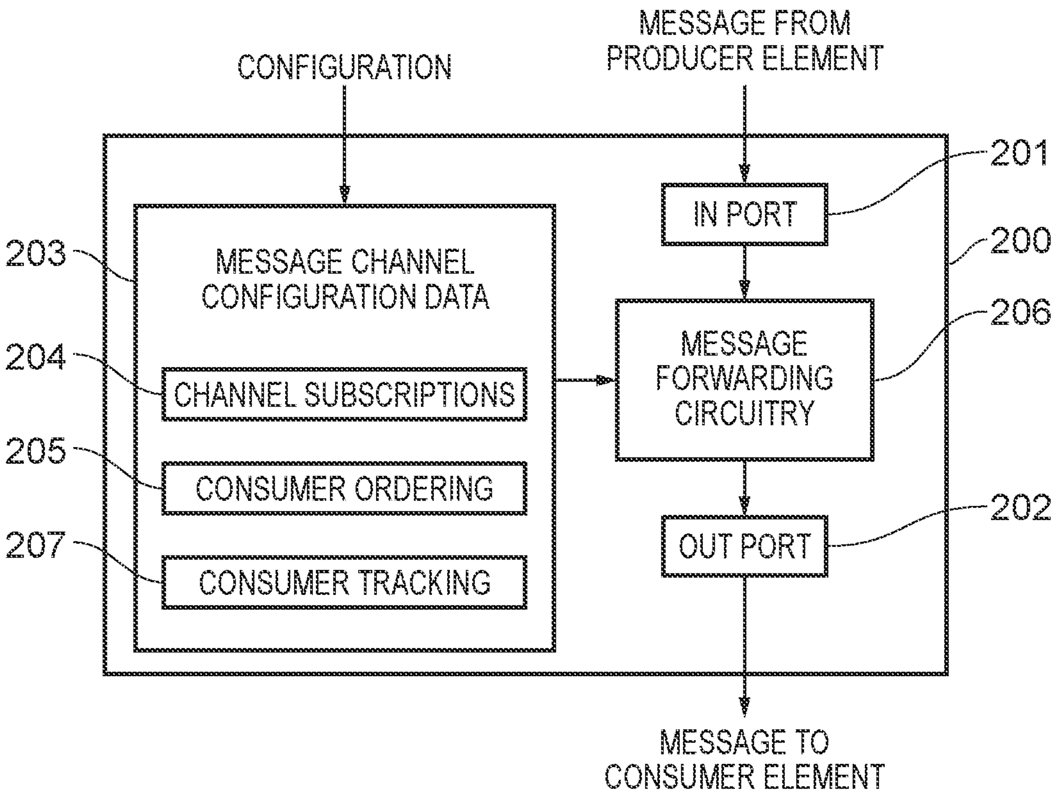
FIG. 3A schematically illustrates a router device in accordance with some examples.
FIG. 3B schematically illustrates configuration data which is stored in a router device in accordance with some examples.

FIG. 3A schematically illustrates a router device in accordance with some examples. The router device 200 comprises an in port 201 and an out port 202, where the in port 201 is arranged to receive blocks of message data atomically originating from a producer element and the out port 202 is arranged to transmit blocks of data atomically to a further target (either a further intermediate router device or the target consumer device). The router device is configured by the system privileged agent (e.g. OS or hypervisor) which causes a set of message channel configuration data 203 to be stored in the router 200. The message channel configuration data 203 in particular comprises definitions of channel subscriptions 204. In this example it also comprises consumer ordering data 205 and consumer tracking data 207. The message channel configuration data 203 steers the operation of the message forwarding circuitry 206, such that a block of message data received at the in port 201 is forwarded, via the out port 202 to the correct target, in dependence on the channel subscription data 204. Example channel subscription data is shown in FIG. 3B, where it can be seen that a given message channel (e.g. message channel A) might only have a single subscribed consumer element (consumer X), with the channel subscription data further indicating the required target pointer (PTR_X) for that consumer. However, in other examples a given message channel (e.g. message channel B) can have multiple subscribed consumer elements (consumers X, Y, and Z), where the stored data gives a corresponding target pointer (PTR_X, PTR_Y, and PTR_Z respectively) for each. In examples in which more than one consumer element is subscribed to a given channel there are a number of ways in which the router device might be configured to handle a block of message data received on that channel. For example, the router may forward the block of message data to a selected one of the subscribers, where that selected subscriber is chosen either based on some predefined ordering of consumer elements (as defined by the consumer ordering data 205) or based on some history of which consumer elements have previously been selected (as tracked by the consumer tracking data 207), so that round robin, and other orderings can be followed. Alternatively, the router may forward the block of message data to multiple recipient consumer elements, which may also be selected based on the consumer ordering data 205 or based on the consumer tracking data 207).

In some implementations, the router 200 can be configured to provide broadcast capability by providing a "resend" command to the sender for every message store operation. For each successful send command, the router 200 will send a unique copy of that data from the producer to each subscriber consumer element on the channel. Once each receiver has been sent exactly one copy, the producer will receive a response to indicate "complete". The router is responsible for keeping track of which consumer would receive the next broadcast (e.g., 1 of N consumers will be selected for each message store operation from the producer and the router tracks which consumer is selected via some policy such as round-robin, FIFO, MRU, etc.). The broadcast target list at the router could be sequential (e.g., the router only keeps track of "next"), or it could be discontinuous where the router must keep track of which recipient has received the message out of a set of N in response to consumers that may not be available currently (e.g., the router keeps the consumer tracking 207 as a bit-vector, which tracks which of N consumers have received the message, and each bit could be visited in turn, such as according to a round-robin policy).

Figure 4A:
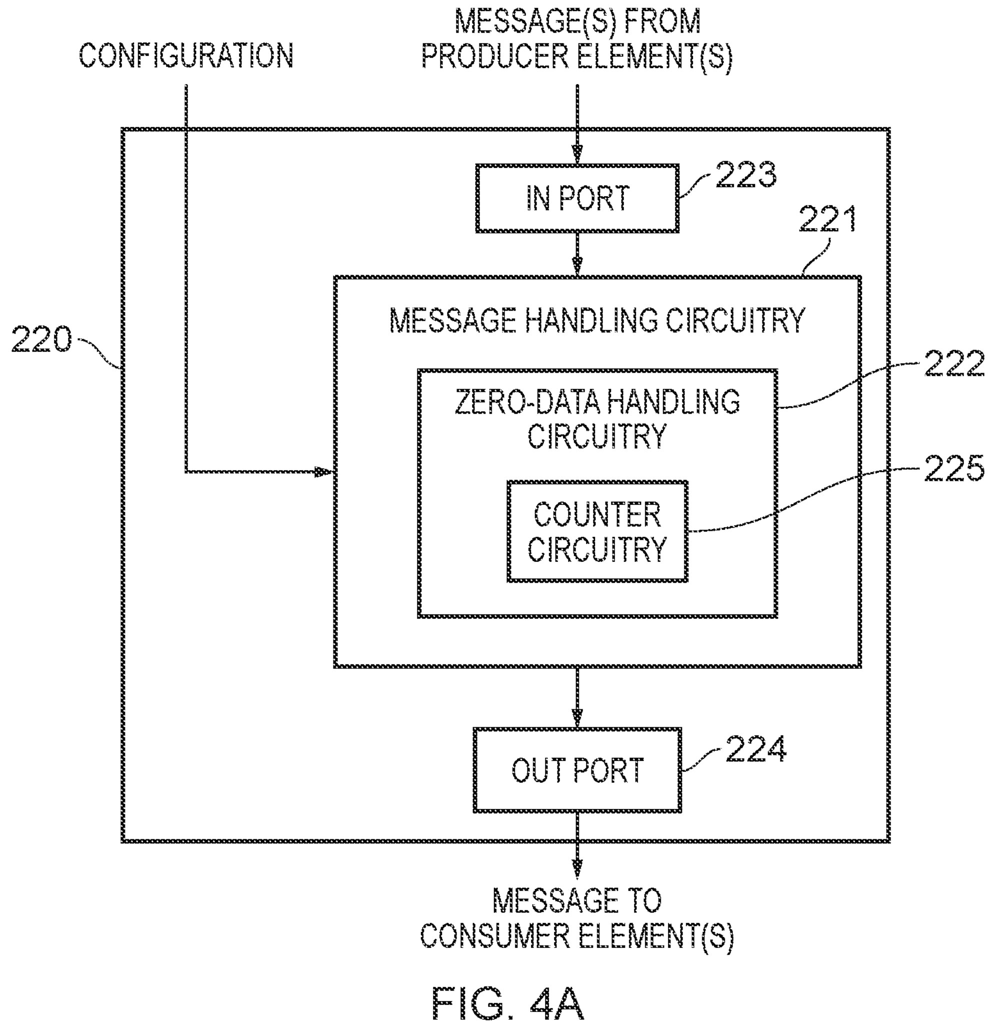
FIG. 4A schematically illustrates a router device comprising zero-data message handling circuitry in accordance with some examples.
Figure 4B:
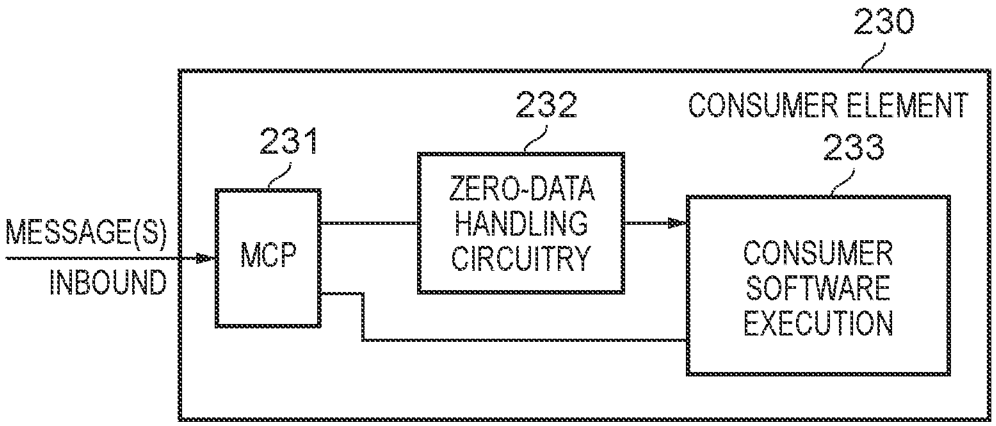
FIG. 4B schematically illustrates a consumer element comprising zero-data message handling circuitry in accordance with some examples.

FIG. 4A schematically illustrates a router device 220 comprising zero-data message handling circuitry 222 in accordance with some examples. Thus, within the message handling circuitry 221 of the router device 220, there is provided zero-data message handling circuitry 222. An in port 223 and an out port 224 receive and transmit zero-data messages. The zero-data message handling circuitry 222 is provided to handle message channels which are configured to have zero-data messages, where in place of the usual block of message data, and indicator of zero-data is instead used. This zero-data message may be used for a variety of signalling purposes. Similarly, FIG. 4B schematically illustrates a consumer element 230 comprising zero-data message handling circuitry 232 in accordance with some examples. Thus, messages are received by the MCP 231 and zero-data messages are identified by the zero-data handling circuitry 232, which signals this to the consumer software 233. Hence, a message channel can be configured to have zero data to send, in either a standard (point-to-point) message channel or a broadcast channel. This zero data channel can utilize a zero data message store command and notify the target MCP on N receivers that a "message" has been received (only no data will be sent). This can be used for lightweight notifications, locks, or synchronization events for multiple consumers (e.g., 1 producer can wake up N consumers). Equally, a message channel, configured for such zero-data messaging can also be configured to provide a "counting" channel, where the router 220 is provided with counter circuitry 225. The router 220 is then configured to receive a defined number of zero data messages on a given channel, one from each of a set of producers, before sending a zero data message to one consumer. This thus provides a variety of "wavefront", where each producer of the defined set for a given "wave" must send a successful message store to the router before a single zero data message is sent to the consumer. In this way a set of producers can synchronize with one consumer. Alternatively, the accumulation can occur at the target MCU within the buffer space for the MCP where instead of the router being responsible for accumulating M zero data message sends, the MCP does the counting (e.g. in the zero-data handling circuitry 232). In a further variant, the counter circuitry 225 of the router 220 or the zero-data handling circuitry 232 of the consumer 230 may be configured to perform basic arithmetic reduction operations on the channel "wave front" data to perform "reduction" operations on a channel over M producer message sends. Examples of these operations could be addition or subtraction. Multiplication could also be performed (however, potential ordering of available operands and operations could cause variation in FP approximation).

Figure 5:
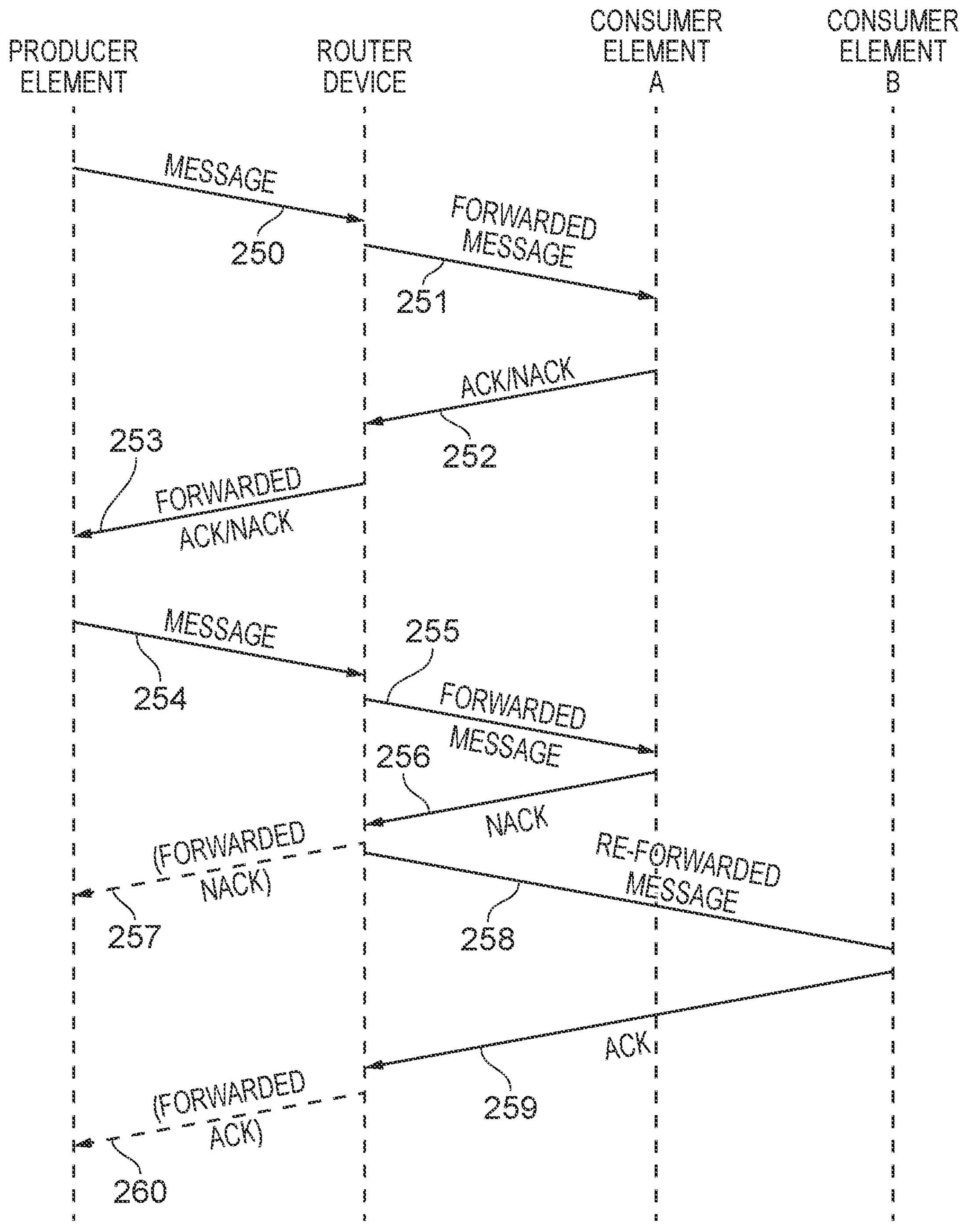
FIG. 5 is a signalling diagram showing an example set of message and acknowledgement signals passed between a producer element, a router device, and two consumer elements in accordance with some examples.

FIG. 5 is a signalling diagram showing an example set of message and acknowledgement signals passed between a producer element, a router device, and two consumer elements in accordance with some examples. The first example shown a message 250 sent from the producer element to the router device is then passed on as a forwarded message 251 from the router device to consumer element A. Consumer element A returns a success/fail (ACK/NACK) signal 252 to the router device, which forwards 253 this signal to the originating producer element. In the second example shown a message 254 sent from the producer element to the router device is passed on as a forwarded message 255 from the router device to consumer element A. However, consumer element A returns a fail (NACK) signal 256 to the router device, which in response re-forwards 258 the message to an alternative recipient (i.e. another subscriber to the same message channel) consumer element B. Consumer element B returns a success (ACK) signal 259 to the router device. The router device may be configured to forward the NACK 256 (as forwarded NACK 257) and/or to forward the ACK 259 (as forwarded ACK 260) to the originating producer element.

Figure 6:
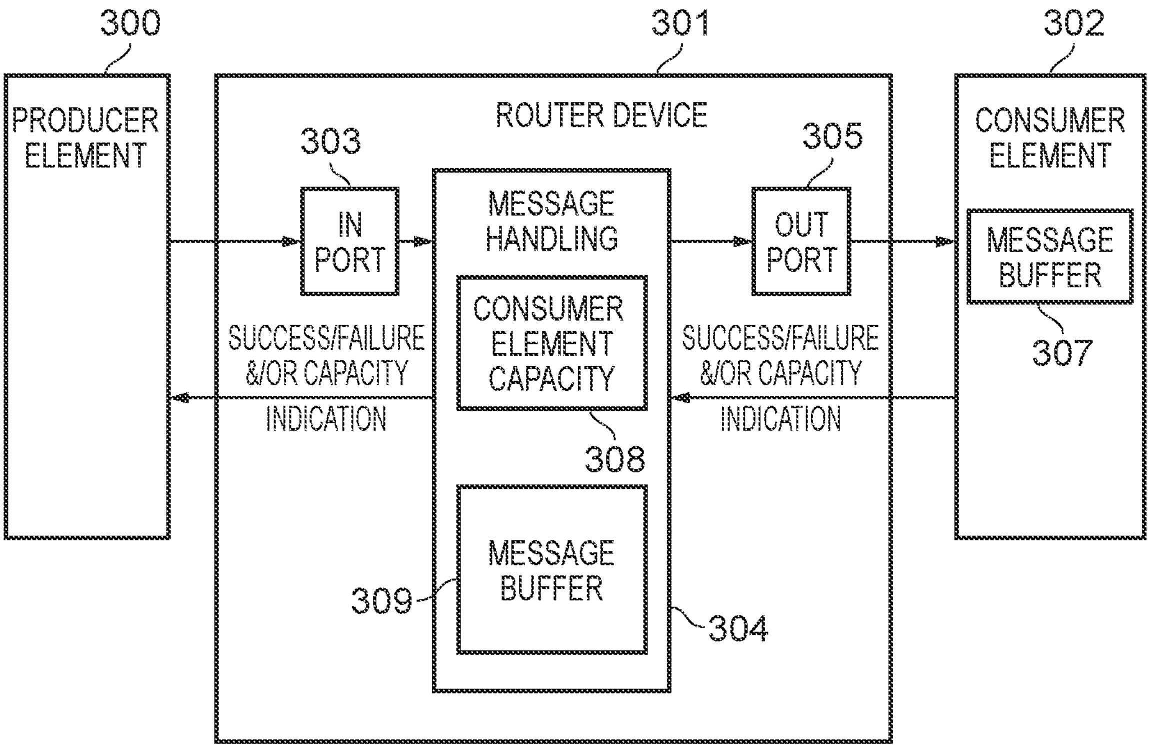
FIG. 6 schematically illustrates a producer element, a router device, and a consumer element in accordance with some examples.

FIG. 6 schematically illustrates a producer element 300, a router device 301, and a consumer element 302 in accordance with some examples. Generally, a message from the producer element 300 is received by the in port 303 of the router device 301. Message handling circuitry 304 of the router device 301 then causes the message to be appropriately forwarded via the out port 305 to the consumer element 302. The consumer element 302 is provided with a message buffer 307 and the finite capacity of this message buffer means that the consumer 302 will not always be able to successfully receive a message. The consumer element 302 can return a success or failure indication in response to an attempt to deliver a message. Such success or failure indications can also be returned to the producer element 300. Additionally, the message handling circuitry 304 of the router device 301 is provided with consumer element capacity tracking circuitry 308, which tracks each consumer element to which the router device 301 is configured to forward messages and stores credits for each target device, so that the router can know a priori whether a message relayed from the producer will be received successfully. Additional bit fields can also to be added for indicating additional endpoint conditions (e.g., target swapped out) so that this early response from the router can be implemented. The router device 301 also comprises message buffer 309 to store multiple received blocks of message data in a defined order and forwards the multiple blocks of message data respecting the ordering defined by the message block buffer (in this example the ordering being first-in-first-out ordering, though other orderings may also be implemented). The message buffer 309 also has a finite capacity and when it is full the router device 301 can signal the failure to receive a message to the producer element 300. However, where the router device 301 has a cycle-by-cycle approach to forwarding content of the message buffer 3092 recipient consumer elements, the router device 301 can also respond to a failure to buffer a received block of message data, by signalling a fail-but-retry message to the producer element, which indicates that the block of message data which has just failed to be received will be able to be received at the next processing cycle. The message buffer 309 can reserve a buffer entry for the following retry operation to support this.

Figure 7:
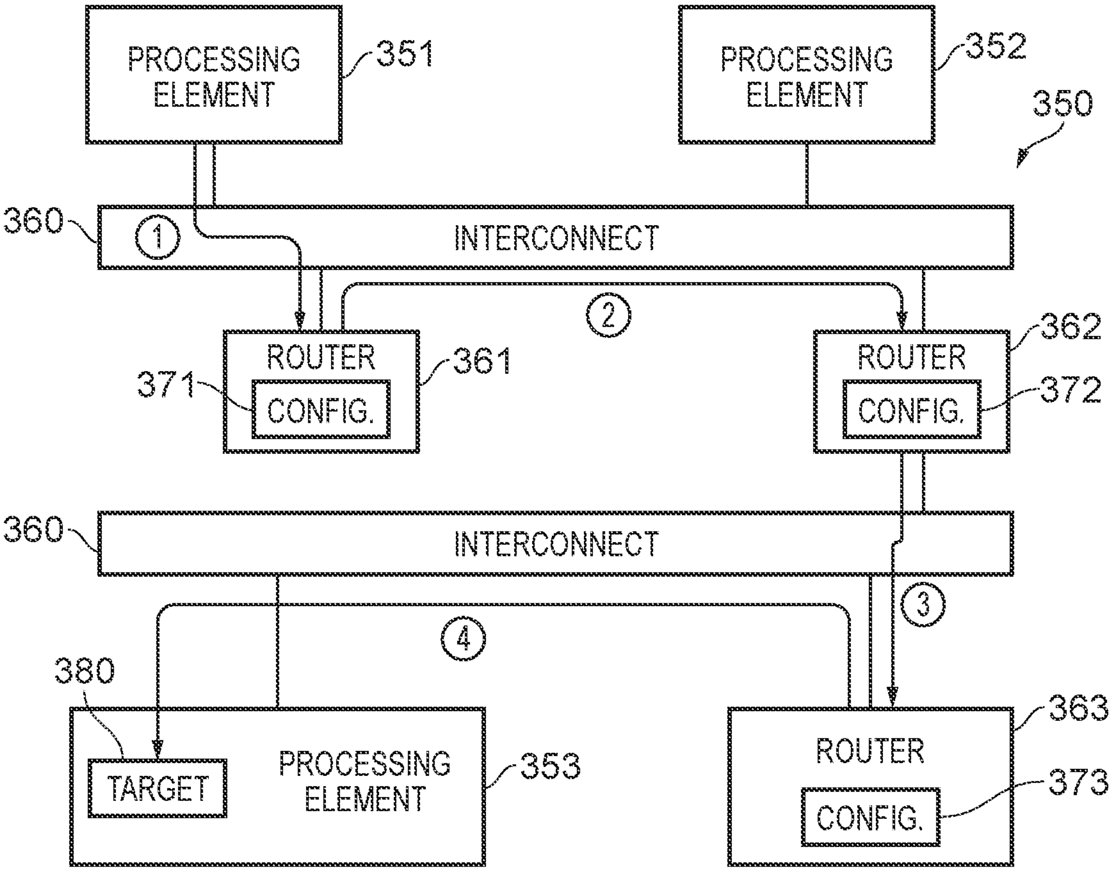
FIG. 7 schematically illustrates a data processing system comprising multiple router devices in accordance with some examples.

FIG. 7 schematically illustrates a data processing system 350 comprising multiple router devices in accordance with some examples. A number of processing elements 351, 352, 353 are shown, coupled to interconnect 360. Also shown coupled to the interconnect 360 are multiple router devices 361, 362, 363, each having a configuration (371, 372, 373 respectively) provided by the system privileged agent. It should be noted that in this example (and throughout this disclosure) a router device may be considered to be a device coupled to the interconnect circuitry or alternatively may be considered to be an integral part of the interconnect circuitry. The figure shows an example path which may be formed to provide a message channel, used by the processing element 351 to send a block of message data to a target 380 in processing element 380. As can be seen a concatenated arrangement is set up, whereby the message channel is formed in four sections. A first section conveys the block of message data from the processing element 351 to the router 361. A second section conveys the block of message data from the router 361 to the router 362. A third section conveys the block of message data from the router 362 to the router 363. A final, fourth section conveys the block of message data from the router 363 to the target 380.

Figure 8A:
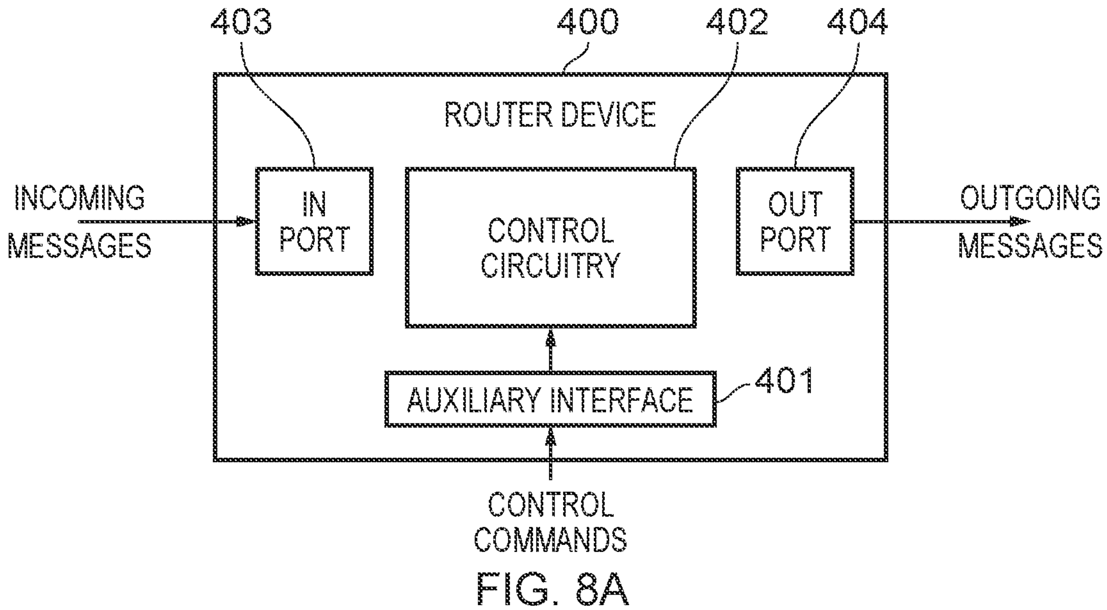
FIG. 8A schematically illustrates a router device comprising an auxiliary interface via which control circuitry can be accessed in accordance with some examples.
Figure 8B:
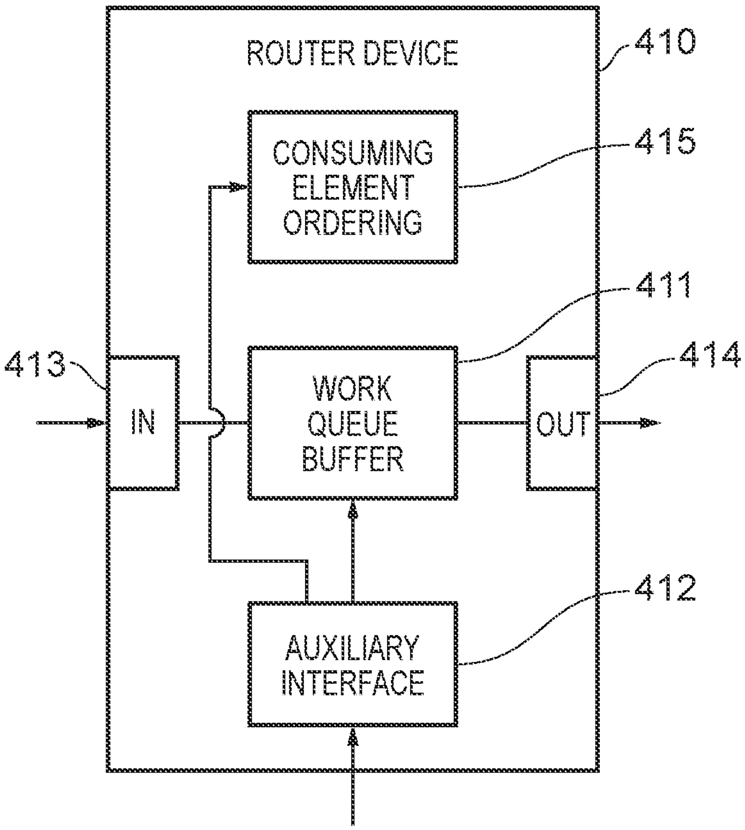
FIG. 8B schematically illustrates a router device comprising a work queue buffer in accordance with some examples.

FIG. 8A schematically illustrates a router device 400 comprising an auxiliary interface 401 via which control circuitry 402 can be accessed in accordance with some examples. As is the case for all router devices in this disclosure the router device 400 also comprises an in port 403 and an out port 404 for receiving and sending messages respectively. The auxiliary interface provides a control access to the control circuitry 402 such that a permitted agent in the data processing system can issue control commands which can at least partially control the operation of the router device 400. Some particular usages of such an auxiliary interface are shown in the example of FIG. 8B, which schematically illustrates a router device 410 comprising an auxiliary interface 412, a work queue buffer 411, and consumer element ordering control 415 in accordance with some examples. The router device 410 also comprises an in port 413 and an out port 444 for receiving and sending messages respectively. The auxiliary interface 412 allows the agent providing the control commands to determine the operation of either or both of the work queue buffer 411 and the consumer element ordering control 415. When more than one consumer element is subscribed to a given message channel, the consumer element ordering control 415 determines the order in which the consumer elements are selected to be the recipient of a given block of message data. The agent providing the control commands can thus adjust the per-channel targeting of message (e.g., provide custom logic to decide which downstream per-channel targets receive the next message based on some cost function of quality-of-service guarantee).

The work queue buffer 411 allows a message channel to be used as a work queue and the message channel router 410 (controlled via its auxiliary interface 412) can then act as a scheduling agent for downstream consumer element targets. Hence a producer on a work stream (or producers) could enqueue work targeting a given VA (mapped by the OS for this purpose) and the router device 410 is augmented with additional functionality to allow buffering of these jobs (in the work queue buffer 411) for example into levels of priority (e.g., three priority queues to implement a multi-level queue scheduler). The auxiliary interface allows the attachment of a controller (not shown) which could run in hardware or in firmware and control the dispatch targets of jobs on a channel. The target consumer elements of the jobs are pre-configured in software (i.e., they would be subscribers to the configured message channel). The buffering for the priority queue could be internal to the scheduler SRAM, or be allocated as pinned system memory and given to the auxiliary scheduler via a set of registers (e.g., when configuring the scheduler, software would allocate/pin memory to a PA range then set the values within the auxiliary scheduler's defined register set), or this address range could be given to the scheduler as a VA and the auxiliary scheduler could obtain the PA via an address translation service (e.g., IOMMU or system memory management unit). This auxiliary interface could also use additional system features for scheduling decisions such as a thread context table.

Figure 9:
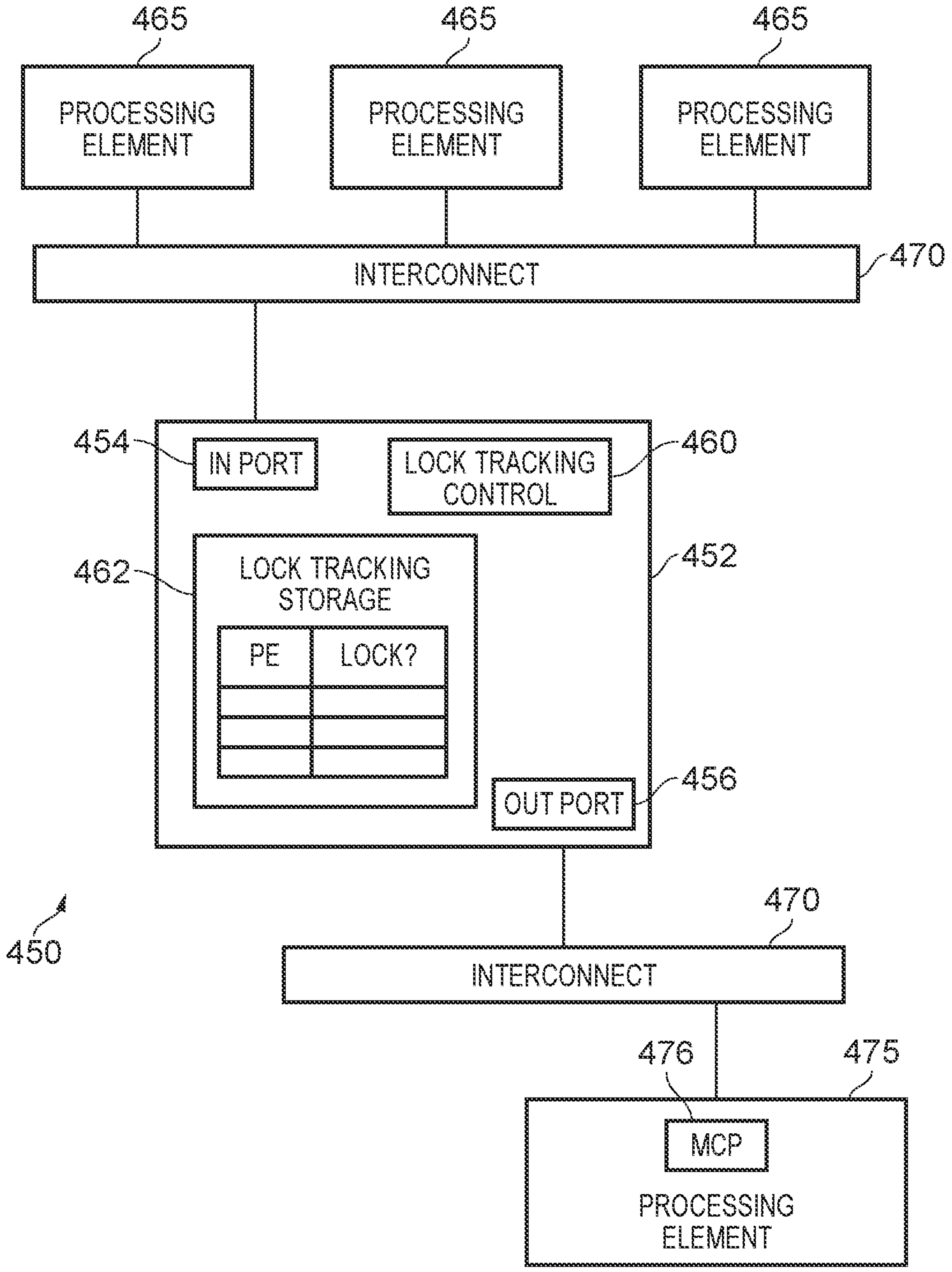
FIG. 9 schematically illustrates a data processing system comprising a router device which comprises a lock tracking mechanism in accordance with some examples.

FIG. 9 schematically illustrates a data processing system 450 comprising a router device 452 which comprises a lock tracking mechanism in accordance with some examples. This lock tracking mechanism is another example of the use of the zero-data messaging variant described above. The lock tracking mechanism is established in the router device 452 by the system privileged agent (e.g. part of the OS) which configures the system at start up. To support this mechanism, the router device 452 comprises lock tracking control 460 and lock tracking storage 462, as well as the usual in port 454 and out port 456. A number of processing elements 465, which each may seek to acquire the lock supported by this lock tracking mechanism, are coupled to the interconnect 470. A further processing element 476 with a target MCP 476 is also shown. The processing elements 465 can each signal their desire to acquire the lock by sending a zero-data message on a message channel defined for this purpose. The lock tracking control uses the lock tracking storage to administer the lock tracking mechanism. A first processing element which signals its desire to acquire the lock is given the lock, and this fact is recorded in the lock tracking storage by the storing of an identifier of the processing element and an associate lock bit being set to indicate the acquisition of the lock. The lock tracking control signals the lock acquisition to the first processing element. If the first processing element which signals its release of the lock (which may also be signalled by the sending the zero-data message on the defined message channel), the lock bit is cleared and the identifier of the processing element invalidated. However, if a further processing element signals its desire to acquire the lock whilst the lock is still held by the first processing element, this fact is recorded in the lock tracking storage by the storing of an identifier of the further processing element. When the first processing element relinquishes the lock the content of the lock tracking storage 462 indicates when another processing element is queued to acquire the lock. The lock bit can then be set for the further processing element, indicating that it has now acquired the lock (and the lock tracking control signals the lock acquisition to the further processing element).

Figure 10A:
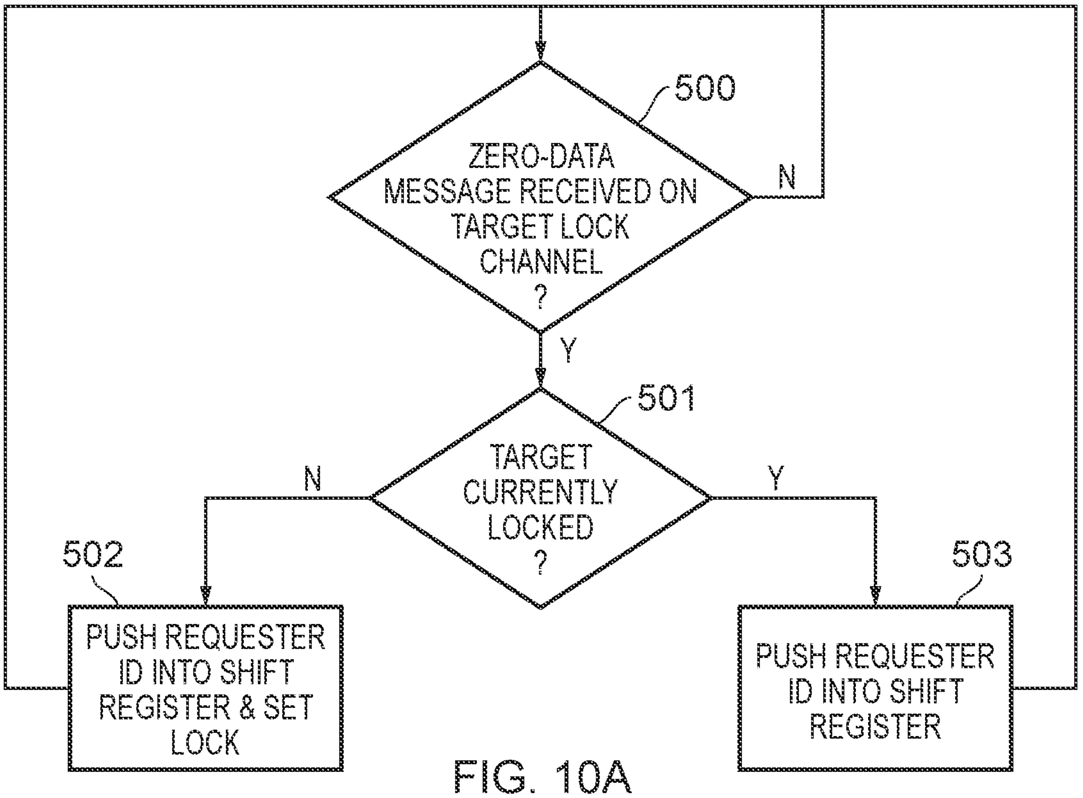
FIGS. 10A and 10B are flow diagrams showing two sequences of steps which are taken in operating a lock tracking mechanism in a router device in accordance with some examples.
Figure 10B:
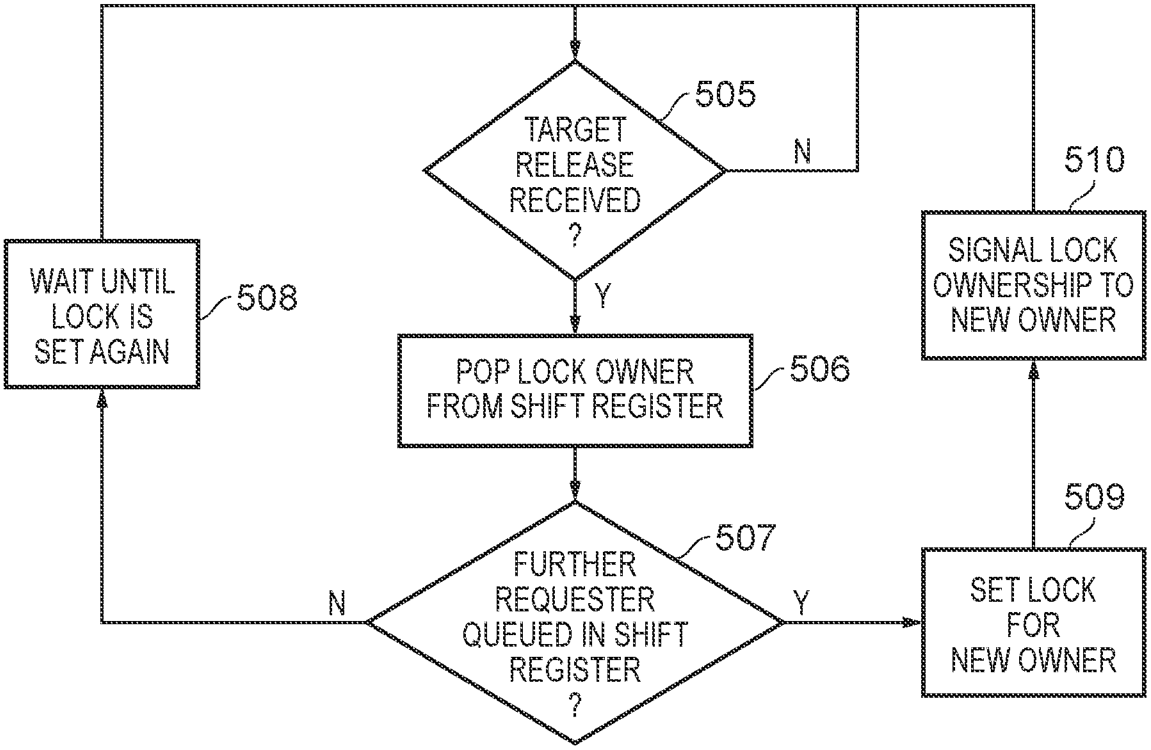

FIGS. 10A and 10B are flow diagrams showing two sequences of steps which are taken in operating a lock tracking mechanism in a router device in accordance with some examples, which make use of a shift register as the lock tracking storage. The flow of FIG. 10A can be considered to begin at step 500, where it is determined if a zero data message has been received on the target lock message channel. The flow loops on itself at this step until this occurs. When such a message is received the flow proceeds to step 501, where it is determined if the target is currently locked. It is not then at step 502 the requester's identifier is pushed into a shift register and a corresponding lock bit is set. The flow returns to step 500. If however at step 501 it is determined that the target is currently locked, then at step 503 the requested identifier is pushed into the shift register in order to queue this requester to acquire the lock. The flow returns to step 500. In parallel to the flow of FIG. 10A the steps of FIG. 10 B are carried out, we can be considered to begin at step 505, where it is determined if a target lock release has been received. The flow loops on itself at this step until this occurs. When such a message is received the flow proceeds to step 506, where the lock owner's identifier is popped from the shift register. Then at step 507 it is determined if a further requester is still queued in the shift register (i.e. has now been exposed by the popping at step 506). If this is not the case, then the flow waits at step 508 until the lock is acquired (set) again. When at step 507 it is determined that a further requester is indeed queued in the shift register, the flow proceeds to step 509 where the lock is set for that requester which is then the new lock owner. The new lock ownership is signalled to the new owner at step 510 and the flow returns to step 505.

Hence, ticket-locks or MCS locks can make use of a message channel conveying zero data messages as described above. Such a ticket-lock and MCS lock are both be more efficient than existing coherence-based approaches, whilst providing the same software API (top level) to the programmer. In one example implementation the router is augmented with a tracking mechanism (such as one of those described above) for each targetable PE in the system (e.g., 256 PEs). This tracking mechanism (internal to the router) could take the form of a shift register, and for 256 PEs this would be 2048 bits. The first thread to acquire the lock has its core-ID shifted into the first 8 bits starting at position zero of the ticket lock shift register, which is the implicit head. An index is kept into the head of the shift register based on $\log_2$(#PEs) offsets for each index. An additional bit is also used to indicate if this channel identifier (lock channel) is currently locked. To acquire a lock a thread/context with a valid VA for the lock message channel initiates a message store operation without data to the channel (enqueuing the first core-ID if the lock is currently active). The response from the router could either be success (which means that the initiating core has acquired an immediate lock) or defer (which means that the initiating core must wait until it receives a "lock-message" from the router. If immediate acquisition occurs, the lock is held by the initiating thread until it is release, else, the core can choose to continue to do something else or wait for the MCP to populate with a lock token. If a lock is immediately gained, then there were no waiting objects in the queue and the lock-active-bit was set to '0'. On acquiring the lock, the lock active bit is set to '1' in the case of an empty shift register. If a lock is not immediately acquired, it means that the lock-active-bit must be '1' and the requesting core must wait its turn. On waiting, the core can spin, wait-for-event (an Arm AArch64 instruction that places the core into a low-power state in wait) or take other action. To release the lock, the core holding the lock incorporates another message store (another zero data message) to the lock message channel (using the VA that maps to the correct channel identifier). This has the effect of popping the core-ID from the head of the tracking queue and pushing a lock-token to the new core's MCP as a no-data message store from the routing device (transferring the lock to the next core). Conditions could arise when threads attempting to acquire a lock are swapped off (via software PE multiplexing). A further variant provides that the OS or supervisor software removes the calling core index from the lock queue for that channel ID. The router in this case could be augmented with additional indexing that would point each PE index into the shift register for fast look-up.

Figure 11A:
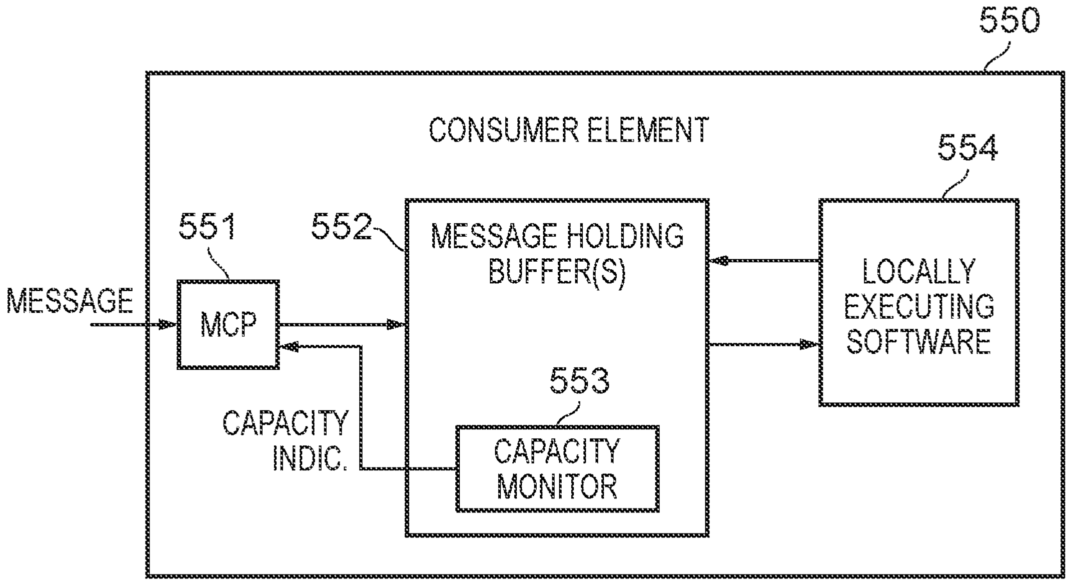
FIG. 11A schematically illustrates a consumer element comprising one or more message holding buffers in accordance with some examples.
Figure 11B:
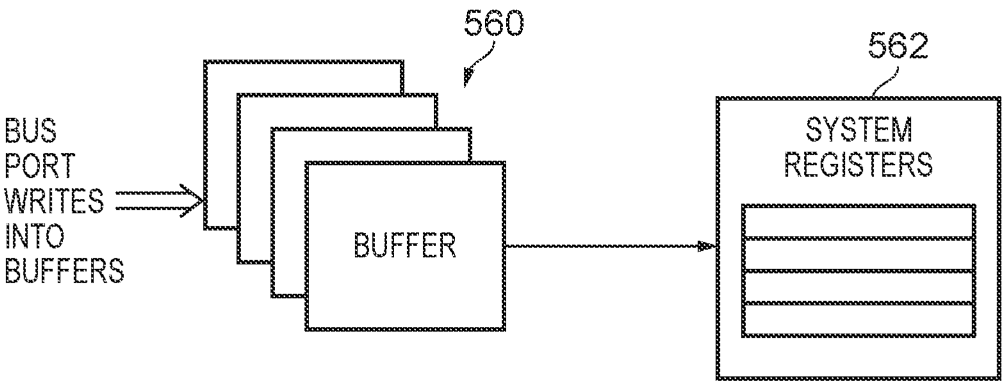
FIG. 11B schematically illustrates the passing of message data from a message port to one or more message holding buffers and into system registers in a consumer element in accordance with some examples.

FIG. 11A schematically illustrates a consumer element 550 comprising one or more message holding buffers 552 in accordance with some examples. The MCP 551 of the consumer element 550, which receives a block of message data atomically, is arranged to forward the block of message data received atomically to the holding buffer(s). The message holding buffer(s) 552 further comprise a capacity monitor 553, which provides the MCP 551 with a capacity indication, in particular indicating to the MCP 551 when the buffer(s) is/are full, such that the MCP 551 in turn can then respond to an attempt to deliver a block of message data with a success or failure indication. The user software 554 executing on the consumer element can test whether the holding buffer currently holds a block of message data on a message channel to which the user software is subscribed. When this is the case the software retrieves the block of message data and processes it. FIG. 11B schematically illustrates the passing of message data from a message port to one or more message holding buffers 560 and from there into system registers 562 in a consumer element in accordance with some examples. The message holding buffers 552 may be provided by a set of system registers, by vector registers, by user software addressable memory buffer, or other suitably sized accessible storage into which the MCP 551 can transfer blocks of received message data. The message holding buffers 552 can be sub-divided into a plurality of sub-buffers, where each is allocated to a corresponding message channel to which the consumer element is subscribed, in order to reserve buffer space for each channel. Alternately or in addition at least a portion of a message holding buffer can be reserved for at least one prioritised message channel to which the consumer element is subscribed.

Figure 12A:
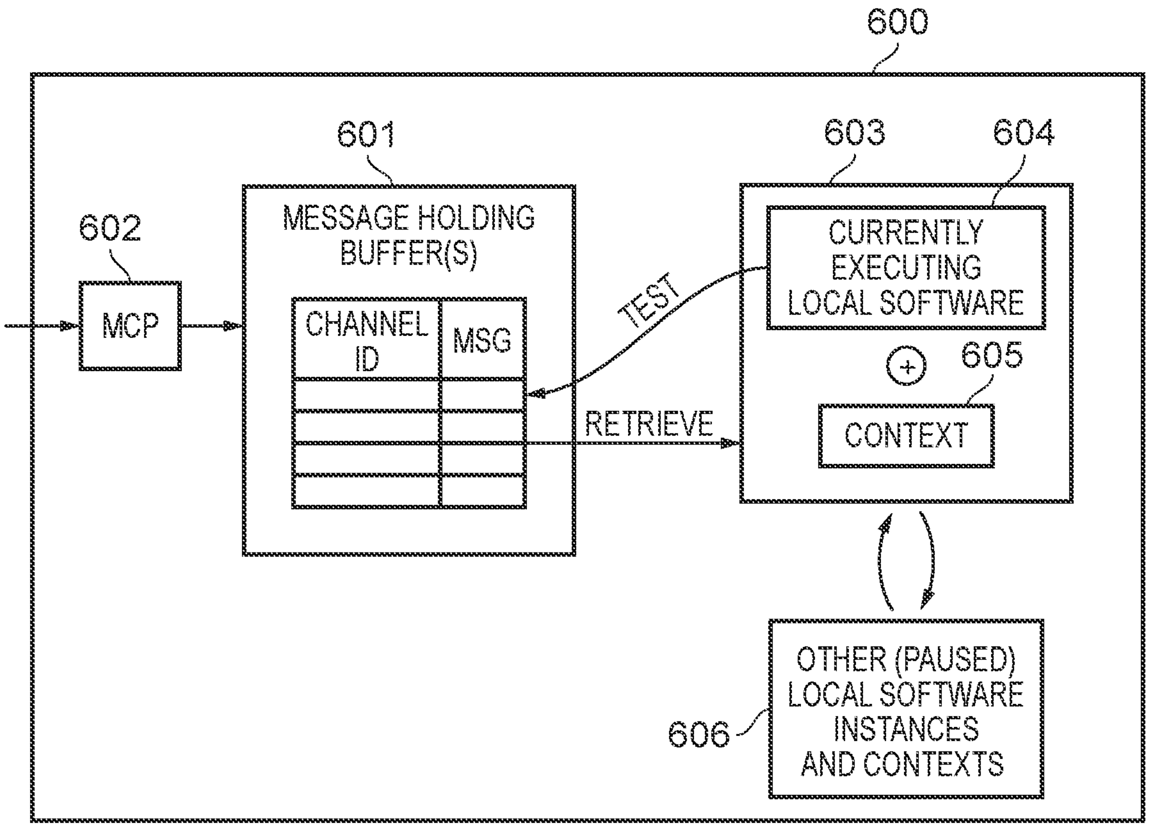
FIG. 12A schematically illustrates a consumer element comprising one or more message holding buffers and which can switch between more than one execution context in accordance with some examples.

FIG. 12A schematically illustrates a consumer element 600 comprising one or more message holding buffers 601 in accordance with some examples. Blocks of message data received at the MCP 602 are forwarded to the message holding buffer(s) 601 and held together with an indication of the message channel for each. The data processing circuitry 603 of the consumer element 600 is shown to be executing certain local software 604 (i.e. has a local currently active thread) which is associated with a corresponding set of context data 605. The currently executing local software 604 is arranged to monitor the content of the message holding buffer(s) 601 and in particular to test whether a message channel to which the currently executing local software 604 is subscribed has a message held there. When this is the case the message is retrieved for processing. The processing circuitry 603 of the consumer element 600 is arranged to switch between execution threads (i.e. to context switch) and when this occurs the current context data is stored and a stored set context data for the incoming context is loaded. In particular, this change of executing thread will change the relevant message channels which are monitored to those to which the new thread is subscribed.

Figure 12B:
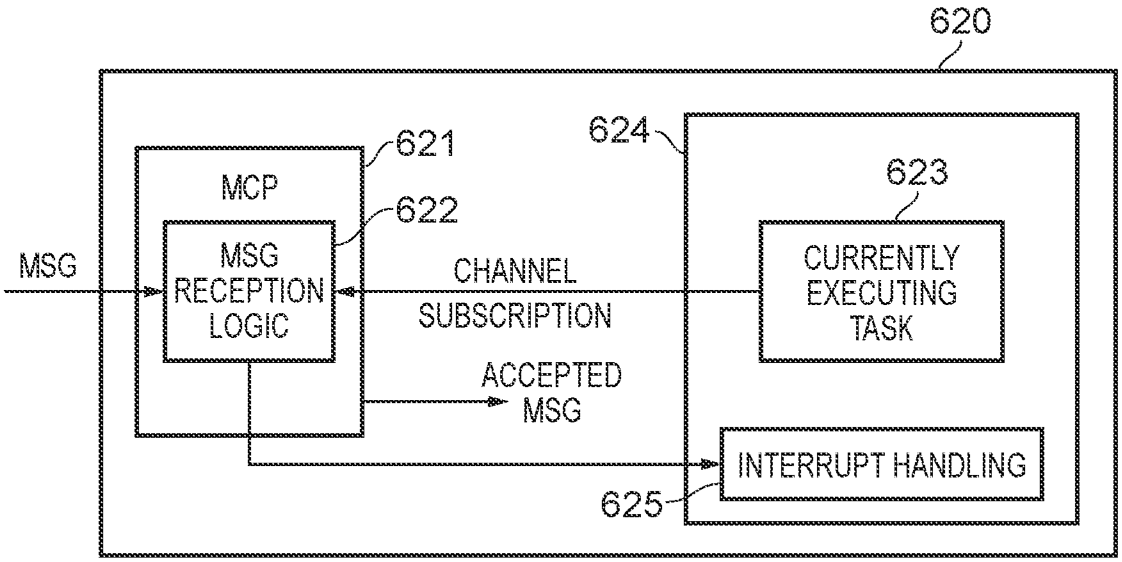
FIG. 12B schematically illustrates a consumer element which can switch between more than one execution context and in which its message port can trigger an interrupt signal in accordance with some examples.

FIG. 12B schematically illustrates a consumer element 620 which can switch between more than one execution context in the manner described with reference to FIG. 12A. Further, the MCP 621 of the consumer element 620 is provided with message reception logic 622. A particular function of the message reception logic 622 is to control the acceptance or rejection of newly arriving messages on the basis of the currently executing task (thread) on the processing circuitry 624. The message reception logic 622 in particular receives channel subscription information relevant to the currently executing task and in some examples is configured to reject messages received at the MCP 612 on message channels to which the currently executing task is not subscribed. In alternative examples, when a message is received at the MCP 621 a message channel to which the currently executing task is not subscribed, the block of message data is received and the message reception logic 622 can be configured to generate an interrupt signal which is passed to the processing circuitry 624 (and received by interrupt handling circuitry 625), to trigger a change of context so that the newly received message can be processed. The receiver software (i.e. software running or pending on the consumer element) can be notified via various mechanisms of a relevant message having been received, such as employing a “wait for event” or a local interrupt (indeed a non-local interrupt could also be employed). In some examples a sentinel register can also be used to indicate message receipt, where this register or value can be polled to determine if a new message has arrived. The status that indicates that there is a relevant message available may be in a register such as PSTATE, that can be easily tested or provided from another source, such as an MCU register or a memory location. The message arrival may also generate an event for a Wait for Event instruction. Execution of a Wait for Event instruction (e.g. as provided by the Arm architecture) provides a means for the processor to wait while consuming very little power.

Figure 13A:
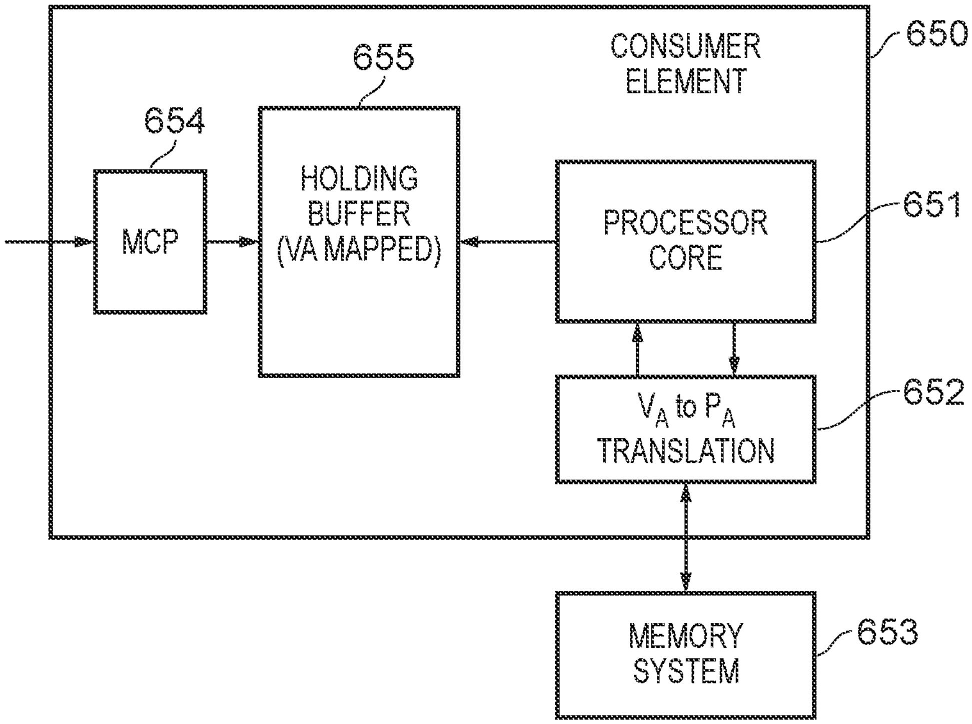
FIG. 13A schematically illustrates a consumer element in which virtual to physical address translation takes place in accordance with some examples.

FIG. 13A schematically illustrates a consumer element 650 in accordance with some examples. The processor core 651 is arranged to perform data processing with reference to virtual addresses and a virtual address specified by the processor core 651 is translated to a physical address by virtual to physical address translation circuitry 652 (such as a memory management unit (MMU)). Thus, accesses to the memory system 653 are specified by the processor core 651 in terms of virtual addresses, but use physical addresses within the memory system 653. In addition, locations in a holding buffer 655 into which blocks of message data received at the MCP 654 are transferred are virtual address mapped, such that holding buffer 655 locations appear in the memory map view that the processor core 651 uses.

Figure 13B:
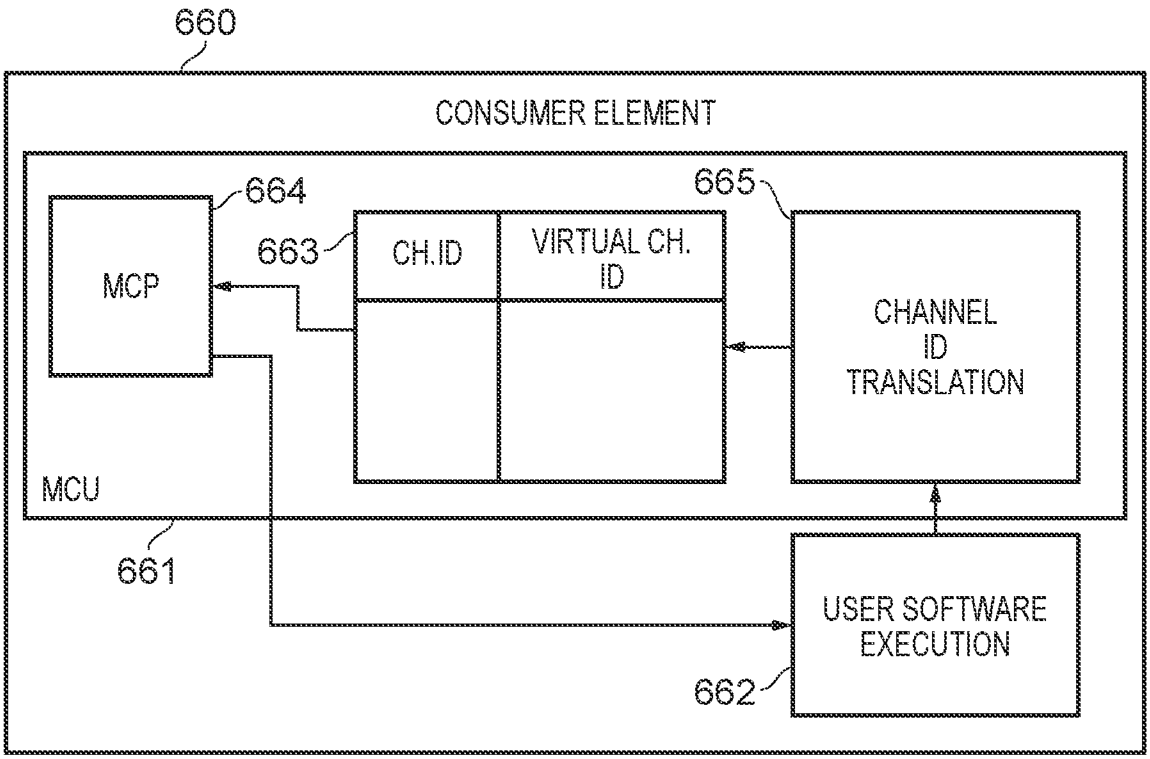
FIG. 13B schematically illustrates message handling circuitry of a consumer element which supports the virtualisation of message channel identifiers in accordance with some examples.

FIG. 13B schematically illustrates message handling circuitry of a consumer element 660 in accordance with some examples. In this example, the virtualisation of message channel identifiers is supported. Accordingly, local consumer message channel numbers are virtualized to renumber the channel numbering used in an MCU 661 to numbers used by consumer software 662. This permits independence of the consumer software that shares the MCU 661 with other consumer software. This renumbering is supported via a virtual channel map 663 in the MCU 661. Hence a virtual channel ID specified by user software 662 is translated by channel ID translation circuitry 665 with reference to the virtual channel map 663 when accessing the MCP 664.

Figure 14:
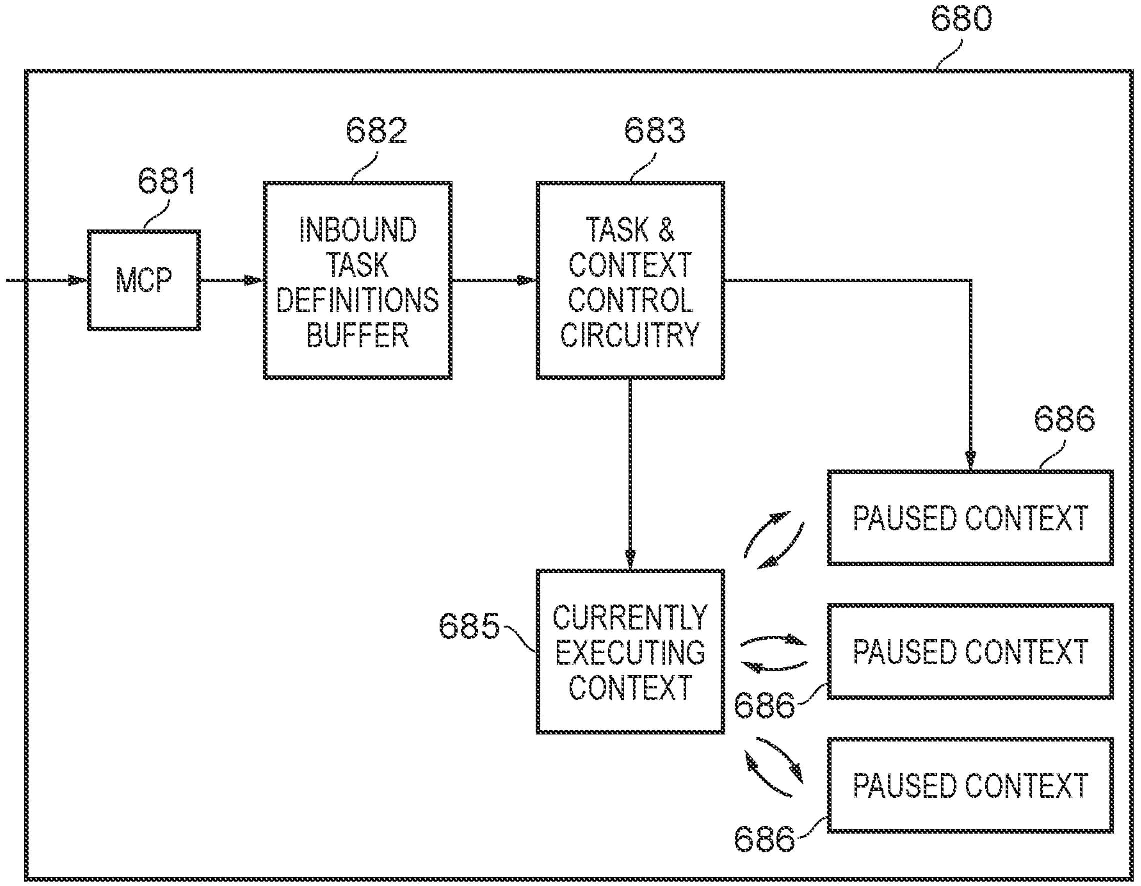
FIG. 14 schematically illustrates a consumer element configured to receive task definitions and to execute corresponding tasks in accordance with some examples.

FIG. 14 schematically illustrates a consumer element 680 configured to receive task definitions and to execute corresponding tasks in accordance with some examples. The consumer element 680 comprises an MCP 681 and message buffer 682, where this example the message buffer 682 is provided for the purpose of buffering inbound task definitions. Each block of message data received by the MCP 681 comprises a task definition for execution by the consumer element 680. Task definitions buffered in the buffer 682 are retrieved by the task and context control circuitry 683, which can define the current execution context 685 and tasks for the consumer element. The task and context control circuitry 683 can be arranged to allow the current execution context 685 to run to completion and then to provide a new task and context in dependence on the queued tasks in the buffer 682. The new context may be one of several paused contexts 686, each of which can be switched in to become the new current context. The task and context control circuitry 683 can also be arranged take action to begin execution of a new task sooner, by causing the current execution context 685 to be paused and for a new context 686 to be switched in, such that the new task can begin execution.

Figure 15A:
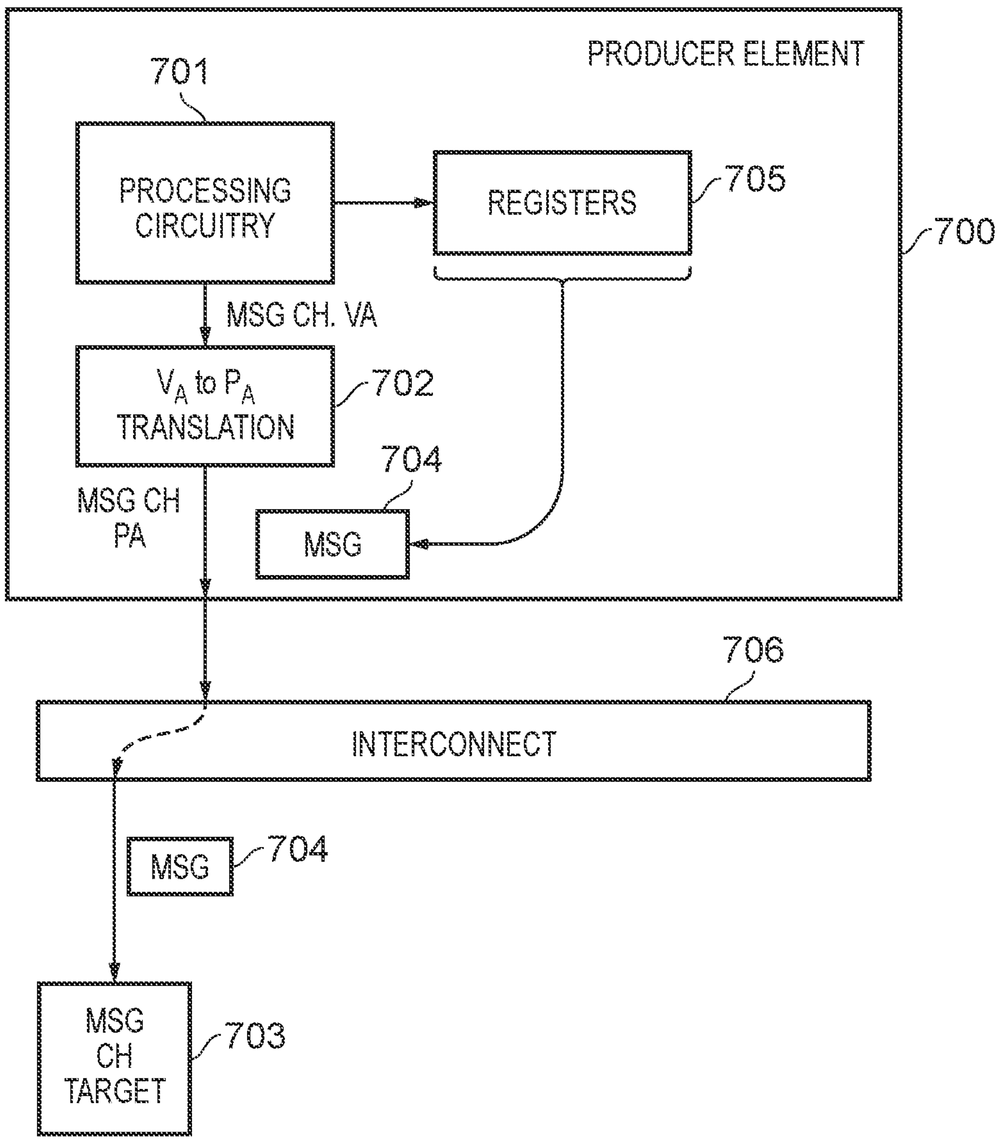
FIG. 15A schematically illustrates a producer element in which virtual to physical address translation takes place in accordance with some examples.

As in the case of the consumer elements, the producer element may also virtualise the memory addresses used. FIG. 15A schematically illustrates a producer element 700 in which virtual to physical address translation takes place in accordance with some examples. Thus the processing circuitry 701 of the producer element specifies virtual addresses and these are converted to physical addresses by virtual to physical address translation circuitry 702 (such as a memory management unit (MMU)). The pointers forming part of the message channel definitions are also mapped into the virtual address space used by the producer element 700, such that when the producer element performs an atomic message store operation to make use of a message channel, a virtual address of the pointer used is converted in to a physical address by the translation circuitry 702. In particular, this physical address corresponds to the message channel target 703 (whether this is an in port of a router or an MCP of a consumer element). Further, FIG. 15A also shows the construction of a block of message data 704, where this block is initially formed in the general purpose registers 705 (e.g. in 8 contiguous registers). Using the translated physical address pointer for the message channel, the producer element performs the atomic message store operation for the message block 704, causing the message to be conveyed by the interconnect circuitry 706 to the target 703.

Figure 15B:
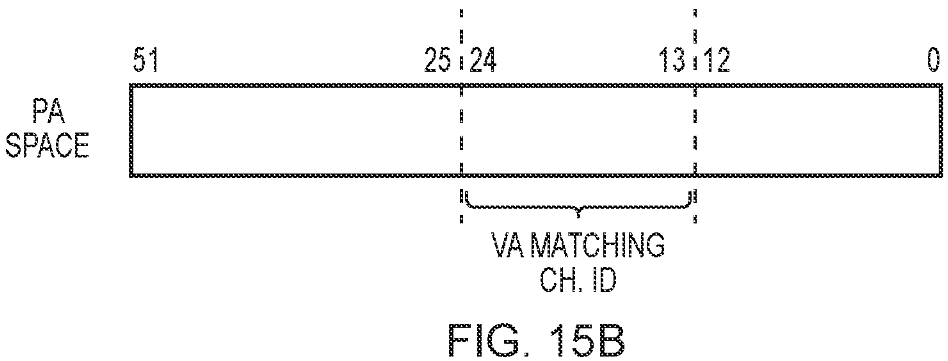
FIG. 15B shows and example of virtual to physical address translation in a producer element in accordance with some examples.

FIG. 15B shows and example of virtual to physical address translation in a producer element in accordance with some examples. A particular feature of this translation is that the physical address mapping enables the physical address to encode for the channel identifier to simplify matching. In this example, the PA space (encoded as 52 bits, 51:0), utilizes a subset of those bits (e.g. 24:13) to identify the specific channel. This enables the aligning of each of 2048 channels in the VA space to a 4KiB virtual page boundary for permissions. This consumes 16 MiB out of the total 4096 TiB available address range. It should be noted that other addressing schemes are possible, e.g., each producer could be given a unique PA which would then be looked-up to match the channel inside a router. Other means such as a CAM could also be used as a look-up for the target channel.

Figure 16:
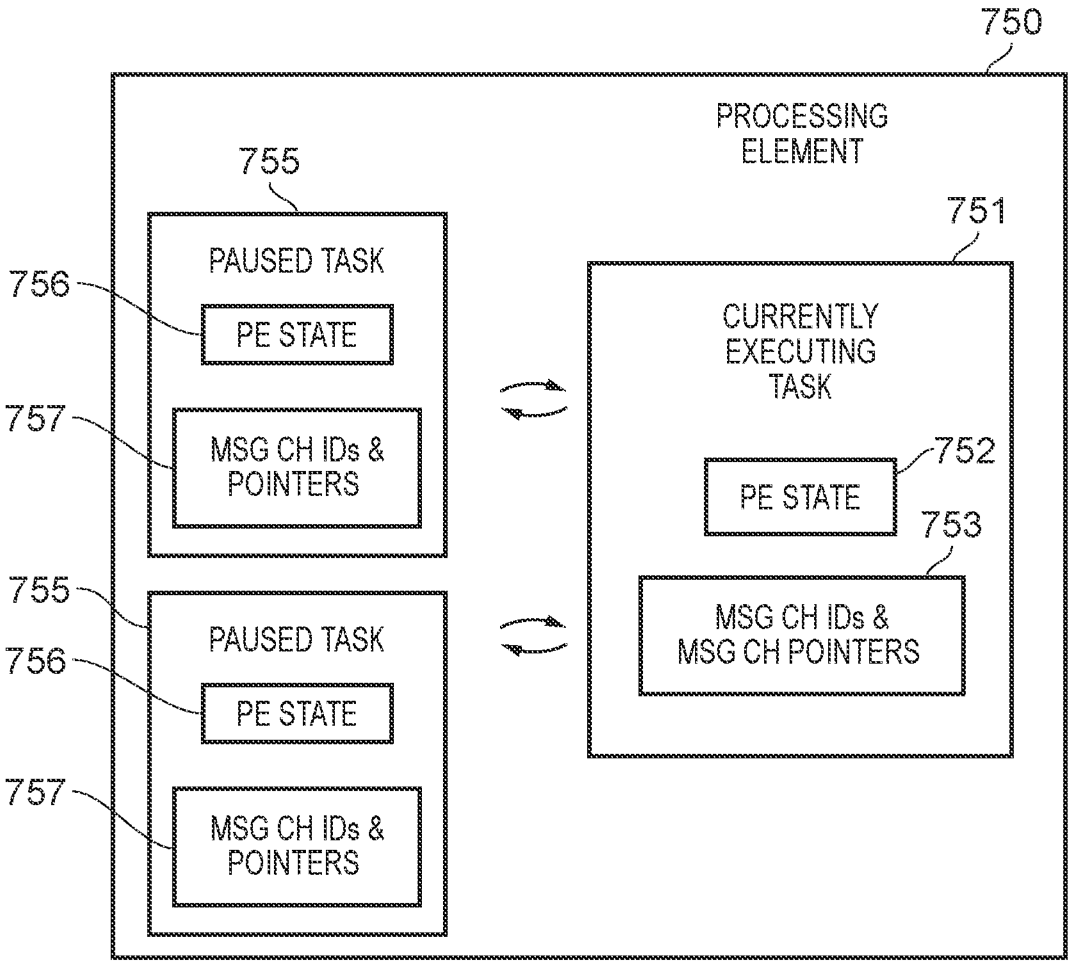
FIG. 16 schematically illustrates a processing element in which processing element state and message channel mappings are switched correspondingly when the processing element switches context in accordance with some examples.

FIG. 16 schematically illustrates a processing element 750 in which processing element state and message channel mappings are switched correspondingly when the processing element switches context in accordance with some examples. The processing element 750 is shown to have a currently executing task 751, which is associated with a set of processor element state 752 and a set of message channel identifiers and message channel pointers 753. Accordingly, in executing this task the processing elements processing configuration is defined by the set of processor element state 752 and the message channels available to it are defined by the set of message channel identifiers and message channel pointers 753. As described above, the processing element can switch between a currently executing task 571 and one or more paused tasks 755. In performing such a context switch, not only is the current process element state 752 stored and replaced by the incoming processor element state 756, but here the current message channel identifiers and message channel pointers 753 are also stored and replaced by incoming message channel identifiers and message channel pointers 756. This enables a freely definable message channel configuration to be employed for each task which may be executed on the processing element. Time-sliced operation of the processing elements for multiple tasks each with individual message channel configurations is thus supported.

Figure 17:
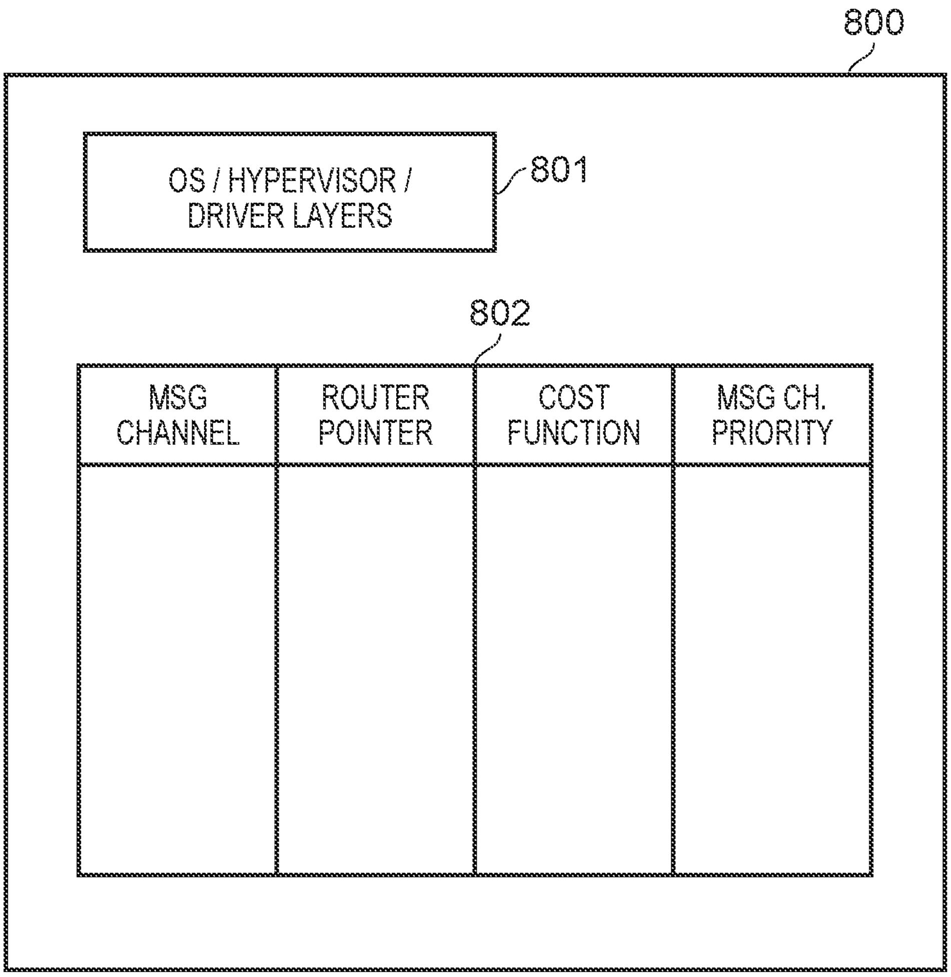
FIG. 17 schematically illustrates a data processing system in which a system privileged agent responsible for establishing the system configuration at boot generates a proximity table for mapping message channels to multiple routers.

FIG. 17 schematically illustrates a data processing system 800 in which a system privileged agent 801 responsible for establishing the system configuration at boot generates a proximity table 802 for mapping message channels to multiple routers. At system start-up the system privileged agent (OS/hypervisor/driver layers) is configured to map each of the plurality of router devices into a physical address space. This is done by constructing a proximity table 802, which comprises information specifying message channel identifiers, router port pointers, and a cost function value. In this example a relative message channel priority is also held. The cost function can take various forms, such as relative physical distance between the router device and the consumer element, available bandwidth between the router device and the consumer element, and/or signalling latency between the router device and the consumer element. The cost functions may be taken into account in various ways, but generally a more efficient configuration results when at least one cost function is minimised by an allocation of a given router device to a given message channel. The relative priority of the message channel can also be folded in to the allocation choice, for example to ensure that, where choices exist, a subset of prioritised message channels benefit from the router allocation at the expense of other non-prioritised message channels.

Thus in systems with more than one routing device, one software implementation (acting as a trusted agent) can map the topology of the PEs in relation to the routing devices within the system using a table similar to the SRAT. Channels are allocated to routers based on the principal of "first-touch" similar to how memory pages are allocated to physical memory. In a similar way as well, if higher-priority channels are allocated and scheduled to a router by an operating system, it may be desirable to move lower priority channels to routers that are further away. Thus the allocation can also be dynamic and using the proximity table created at boot time (or statically provided) the OS/hypervisor/driver layers can deallocate one channel identifier from a given routing device and move it to a target routing device. During this transition, attempted message store operations receive a response of "defer", to indicate they should try again in one implementation or receive a more informative response such as "move-retry", which tells the software that the channel identifier is currently being moved.

In one implementation the OS would not invalidate the PA from the producers which are using it as a message store target until the channel identifier is now active in another router. Once active, the software layer that is initiating the move operation ensures that the page table entry mapping the VA to PA translation is updated to the new PA at the new target router and the software then executes an invalidation of the VA->PA mapping. In an example implementation in the Arm architecture, this is achieved by a TLB invalidation, followed by a barrier). All new message store operations target the same channel identifier at the new message channel router via the new PA (noting that all interim message store operations will have received a fail-retry or defer response, this means that no in-flight state needs to be restored or accounted for, aside from what the software layer packed up from the router and moved). As an overall example, from boot the routers on the interconnect are be mapped into the PA space. Once the initial boot stages are complete, the driver layers that manage the routers for the kernel are booted and a proximity table is constructed as a matrix, with each row could representing a PE, and each column a distance to a given router. Message channels are assigned to routers based on the lowest distance first. This matrix is given to the software layer and kept as part of the allocation process (see the above-described mmap example). Additional routers can be provided dynamically via "hot-plug" operations. At this point, the driver must re-run the table generation above to include the new routers into the topology table.

Figure 18:
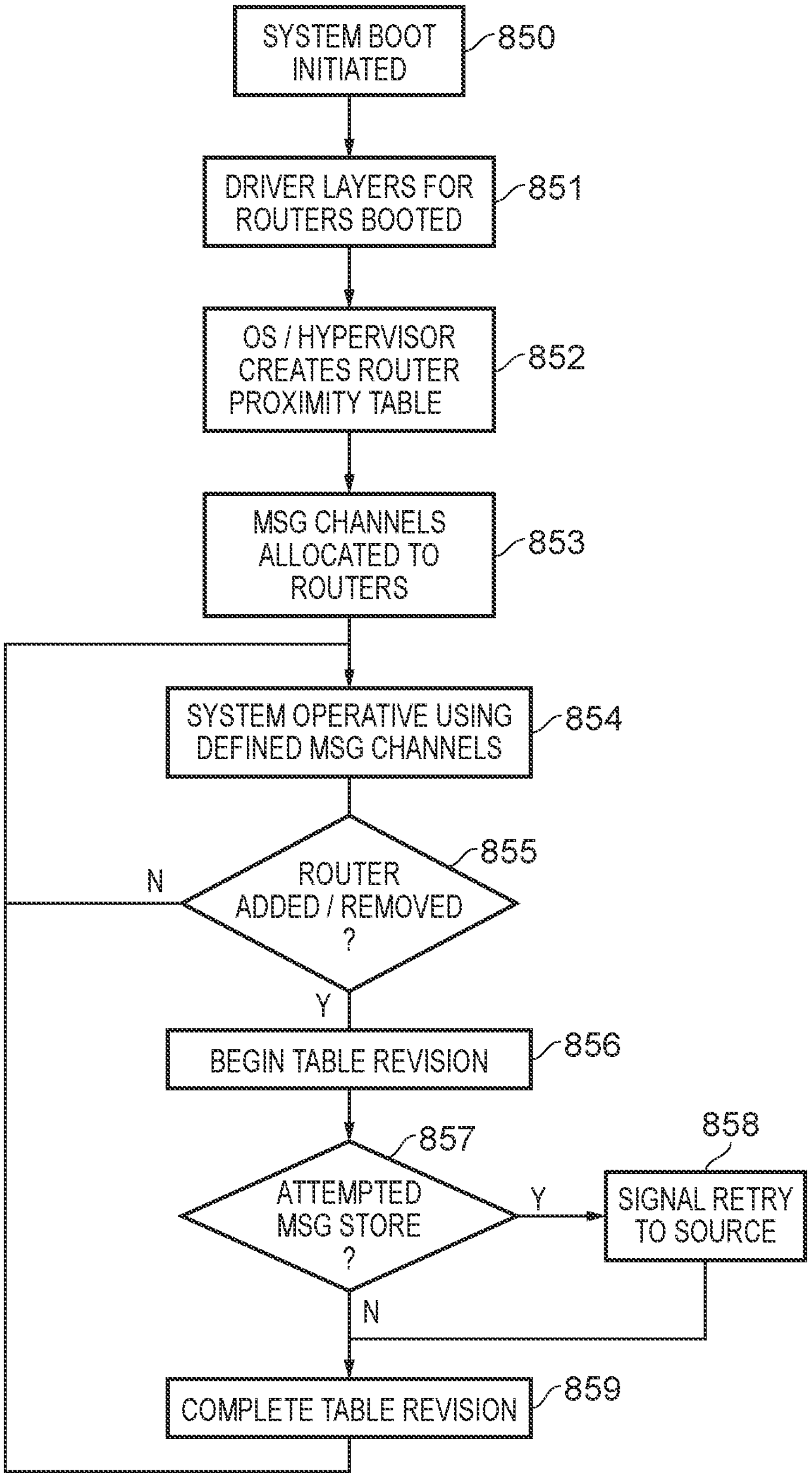
FIG. 18 is a flow diagram showing a sequence of steps which are taken when booting and operating a data processing system comprising multiple router devices in accordance with some examples.

FIG. 18 is a flow diagram showing a sequence of steps which are taken when booting and operating a data processing system comprising multiple router devices in accordance with some examples. The flow begins at step 850 when system boot is initiated. At step 851 the driver layers for the routers are booted. Then at step 852 the OS or hypervisor creates a proximity table for the available routers and at step 853, message channels are allocated to the routers (minimising cost function(s) as described above). The data processing system is then operative at step 854 using the defined configuration of message channels and routers. At step 855 it is determined if a router has been added or removed from the system. When this is not the case normal system operation continues at step 854. However, when a router change occurs, from step 855 the flow proceeds to step 856 where revision of the proximity table begins. Whilst this process is ongoing, including updating locally stored address translations and so on, as described above, it is checked if a message channel store operation is attempted (by any affected part of the message channel configured system). When this occurs the source of the message channel store operation is signalled to defer and retry the operation. The proximity table revision (and router allocation) completes at step 859, and the flow returns to step 854 for normal system operation to continue.

Various disclosed configurations are set out in the following numbered clauses:

Clause 1. A data processing system comprising:

a system privileged agent arranged to define a configuration of the data processing system;

multiple processing elements arranged to perform data processing, wherein the multiple processing elements comprise a producer element and a consumer element; and interconnect circuitry arranged to couple the multiple processing elements with one another, wherein the data processing system supports a message channel functionality according to which:

the system privileged agent is configured to define a message channel for communication between the producer element and a consumer element, the message channel being defined by a message channel identifier and a message channel target pointer, wherein the message channel target pointer indicates a non-cacheable target location associated with the consumer element;

the producer element is configured to perform an atomic message store operation with respect to a block of message data targeting the consumer element, wherein the producer element specifies the message channel identifier and the block of message data; and the interconnect circuitry is configured to convey the block of message data atomically to the non-cacheable target location associated with the consumer element.

Clause 2. The data processing system as defined in Clause 1, wherein the data processing system further comprises:

a router device coupled to the interconnect circuitry and comprising an input port and an output port, wherein the system privileged agent is configured to define the message channel for communication between the producer element and a consumer element by:

providing the producer element with a message channel router pointer indicative of the input port of the router device; and storing message channel configuration data in the router, the message channel configuration data comprising the message channel identifier and the message channel target pointer, wherein the producer element is arranged to perform the atomic message store operation specifying the message channel router pointer, and wherein the router device is responsive to reception of the block of message data at the input port to forward the block of message data from the output port to the non-cacheable target location indicated by the message channel target pointer.

Clause 3. The data processing system as defined in Clause 2, wherein the multiple processing elements comprise multiple consumer elements, and wherein more than one consumer elements subscribe to the message channel, wherein the message channel is associated with multiple message channel target pointers, wherein each of the message channel target pointers indicates a non-cacheable target location associated with a respective consumer element of the multiple consumer elements, and wherein the message channel configuration data stored in the router device comprises the message channel identifier and the multiple message channel target pointers.

Clause 4. The data processing system as defined in Clause 3, wherein the router device is responsive to reception of the block of message data at the input port to select a recipient consumer element from the more than one consumer elements which subscribe to the message channel and to forward the block of message data from the output port to the non-cacheable target location indicated by the message channel target pointer associated with the recipient consumer element.

Clause 5. The data processing system as defined in Clause 4, wherein the router device is configured to select the recipient consumer element in dependence on recipient ordering data for the more than one consumer elements which subscribe to the message channel stored in the router device.

Clause 6. The data processing system as defined in Clause 4 or Clause 5, wherein the router device is further responsive to the reception of the block of message data at the input port to re-forward the block of message data from the output port to each of the more than one consumer elements which subscribe to the message channel.

Clause 7. The data processing system as defined in any of Clauses 2-6, wherein the producer element is further configured to send a zero data message, wherein the zero data message specifies the message channel identifier and an identifier indicative of the zero data message data, and the router device is responsive to reception of a zero data message to forward the zero data message to one or more consumer elements which subscribe to the message channel.

Clause 8. The data processing system as defined in Clause 7, wherein the multiple processing elements comprise multiple producer elements, and wherein more than one producer elements are configured to send the zero data message, and the router device is configured to maintain a count of a number of producer elements from which the zero data message has been received, and the router device is responsive to the count reaching a predetermined threshold value to forward the zero data message to one or more consumer elements which subscribe to the message channel.

Clause 9. The data processing system as defined in any of Clauses 2-8, wherein the consumer element is responsive to reception of the block of message data at the non-cacheable target location indicated by the message channel target pointer to return a success indicator to the router device, wherein the success indicator indicates whether or not the block of message data has been successfully received by the consumer element, and the router device is responsive to reception of the success indicator to forward the success indicator to the producer element.

Clause 10. The data processing system as defined in Clause 9, wherein the router device is responsive to the reception of the success indicator from the consumer element, when the success indicator indicates that the block of message data has not been successfully received by the consumer element, to retry forwarding the block of message data.

Clause 11. The data processing system as defined in Clause 9, wherein the multiple processing elements comprise multiple consumer elements, and wherein more than one consumer elements subscribe to the message channel, wherein the router device is responsive to the reception of the success indicator from the consumer element, when the success indicator indicates that the block of message data has not been successfully received by the consumer element, to retry forwarding the block of message data to another consumer element which subscribes to the message channel.

Clause 12. The data processing system as defined in any of Clauses 2-11, wherein the router device is responsive to the reception of the block of message data at the input port, when no consumer element is available for the message channel, to return a message failure indication to the producer element.

Clause 13. The data processing system as defined in any of Clauses 2-12, wherein the router device is configured to maintain consumer element capacity data indicative of a capacity of the consumer element to receive message data, and when the consumer element capacity data indicates that the consumer element does not have capacity to receive the block of message data at the input port, the router device is arranged to return a message failure indication to the producer element.

Clause 14. The data processing system as defined in any of Clauses 2-13, wherein the router device comprises a message block buffer configured to store multiple blocks of message data, wherein the router device is configured to forward the multiple blocks of message data respecting an ordering defined by the message block buffer.

Clause 15. The data processing system as defined in Clause 14, wherein the ordering is a first-in-first-out ordering.

Clause 16. The data processing system as defined in any of Clauses 2-15, wherein the router device comprises a message block buffer configured to buffer a received block of message data and, when the message block buffer is not available to buffer the block of message data but will be available to buffer the block of message data after a known processing step, to return a fail-but-retry message to the producer element indicating that the block of message data will be receivable after the known processing step.

Clause 17. The data processing system as defined in any of Clauses 2-16, comprising:

a plurality of router devices coupled to the interconnect circuitry and each comprising an input port and an output port, wherein the system privileged agent is configured to define the message channel for communication between the producer element and a consumer element by concatenating the plurality of router devices, such that:

the message channel router pointer specified by the producer element specifies a first router device of the plurality of router devices, and the message channel configuration data stored in each of the plurality of router devices links the plurality of router devices in sequence, such that each router device of the plurality of router devices other than a last concatenated router device is responsive to reception of the block of message data at the input port to forward the block of message data from the output port to a next router device of the plurality of router devices, and the last concatenated router which is responsive to reception of the block of message data at the input port to forward the block of message data from the output port to the non-cacheable target location indicated by the message channel target pointer.

Clause 18. The data processing system as defined in any of Clauses 2-17, wherein the router device further comprises an auxiliary interface providing a control access to the router device, wherein control signals received at the auxiliary interface provide at least partial control of operation of the router device.

Clause 19. The data processing system as defined in Clause 4, or any of Clauses 5-18 when dependent on Clause 4, wherein the router device further comprises an auxiliary interface providing a control access to the router device, wherein control signals received at the auxiliary interface provide at least partial control of operation of the router device, wherein the at least partial control of operation of the router device comprises the selection of the recipient consumer element from the more than one consumer elements which subscribe to the message channel.

Clause 20. The data processing system as defined in Clause 18 or Clause 19, wherein the router device further comprises a work queue buffer arranged to buffer multiple blocks of message data, wherein the multiple blocks of message data comprise task definitions of tasks to be carried out by the consumer element, and wherein the control signals received at the auxiliary interface control scheduling of the tasks to be carried out by the consumer element by selection from the multiple blocks of message data buffered in the work queue buffer.

Clause 21. The data processing system as defined in any of Clauses 18-20, wherein the work queue buffer comprises multiple work queues, wherein the multiple work queues each has an associated priority level relative to each other, and wherein the control signals received at the auxiliary interface control scheduling of the tasks to be carried out by the consumer element respecting the relative associated priority levels of the multiple work queues.

Clause 22. The data processing system as defined in any of Clauses 2-21, wherein the producer element is further configured to send a zero data message, wherein the zero data message specifies the message channel identifier and an identifier indicative of the zero data message data, and wherein the multiple processing elements comprise multiple producer elements, and wherein more than one producer elements are configured to send the zero data message, and the router device further comprises producer element lock tracking storage and the router device is responsive to reception of the zero data message from a lock-seeking producer element to store an indication of the lock-seeking producer element in the producer element lock tracking storage, wherein the producer element lock tracking storage also stores a lock status indication indicative of whether a lock target is currently allocated to one of the multiple producer elements, wherein when the lock status indication is not set, the lock target is allocated to the lock-seeking producer element and the lock status indication is set, and when the lock status indication is set, the indication of the lock-seeking producer element is queued up in the producer element lock tracking storage.

Clause 23. The data processing system as defined in Clause 22, wherein the producer element lock tracking storage is configured as a shift register, wherein storing the indication of the lock-seeking producer element in the producer element lock tracking storage comprises shifting the indication of the lock-seeking producer element into the shift register, wherein when the lock status indication is set and the lock-allocated producer element to which the lock target is currently allocated sends the zero data message again, the router device is configured to pop an indication of the lock-allocated producer element from the shift register, and wherein when popping the indication of the lock-allocated producer element from the shift register reveals an indication of a further lock-seeking producer element, the router device is configured to send the zero data message to the further lock-seeking producer element indicating that the lock target is now allocated to the further lock-seeking producer element.

Clause 24. The data processing system as defined in Clause 1, wherein the system privileged agent is configured to define a router-less message channel for communication between the producer element and a consumer element by providing the producer element with the message channel target pointer indicating the non-cacheable target location associated with the consumer element, wherein the producer element is arranged to perform the atomic message store operation specifying the message channel target pointer.

Clause 25. The data processing system as defined in any of Clauses 1-24, wherein the consumer element comprises a holding buffer accessible to user software executing on the consumer element, wherein the non-cacheable target location associated with the consumer element is configured as a data reception port of the consumer element, and wherein the data reception port is configured to forward the block of message data received atomically to the holding buffer.

Clause 26. The data processing system as defined in Clause 25, wherein the holding buffer comprises at least one of:

a set of system registers;

vector registers; and user software addressable memory buffer.

Clause 27. The data processing system as defined in Clause 25 or Clause 26, wherein the holding buffer is sub-divided into a plurality of sub-buffers, wherein each sub-buffer of the plurality of sub-buffers is allocated to a corresponding message channel to which the consumer element is subscribed.

Clause 28. The data processing system as defined in any of Clauses 25-27, wherein the consumer element is configured to reserve at least a portion of the holding buffer for at least one prioritised message channel to which the consumer element is subscribed.

Clause 29. The data processing system as defined any of Clauses 25-28, wherein the consumer element is responsive to an attempt to deliver the block of message data at the data reception port, to return a success indicator, wherein the success indicator indicates whether or not the holding buffer currently has capacity to receive the block of message data.

Clause 30. The data processing system as defined any of Clauses 25-29, wherein the user software executing on the consumer element is configured to test whether the holding buffer currently holds a user software targeted block of message data on a message channel to which the user software is subscribed.

Clause 31. The data processing system as defined any of Clauses 25-30, wherein the consumer element is configured to support execution of multiple tasks on the consumer element, wherein each task has an individual set of consumer element state and the consumer element is configured to switch to a corresponding individual set of consumer element state when switching to a current task of the multiple tasks.

Clause 32. The data processing system as defined in Clause 31, wherein the consumer element is responsive to an attempt to deliver the block of message data at the data reception port, to receive or reject the block of message data in dependence on whether current task is subscribed to the message channel for the block of message data.

Clause 33. The data processing system as defined in Clause 31, wherein the data reception port is responsive to an attempt to deliver the block of message data at the data reception port, when the current task is not subscribed to the message channel for the block of message data, to generate an interrupt signal for the consumer element.

Clause 34. The data processing system as defined in Clause 25, or any of Clauses 26-33, wherein the consumer element is configured to reference memory locations using virtual addresses and comprises address translation circuitry to perform address translation of the virtual addresses into physical addresses, wherein the consumer element is configured to map a virtual address associated with the message channel to a physical address associated with the holding buffer, and wherein the consumer element is configured to access the message channel by execution of a load instruction specifying the virtual address.

Clause 35. The data processing system as defined in any of Clauses 1-34, wherein the consumer element comprises message channel handling circuitry comprising the non-cacheable target location, wherein the message channel handling circuitry is configured to reference message channels using message channel identifiers, wherein user software executing on the consumer element is configured to reference the message channel using a virtual message channel identifier, and the consumer element comprises message channel identifier translation circuitry configured to translate virtual message channel identifiers to message channel identifiers in dependence on user software currently executing on the consumer element.

Clause 36. The data processing system as defined in any of Clauses 1-35, wherein the consumer element is configured to receive task definitions via the message channel and the block of message data provides at least a part of a task definition for the consumer element.

Clause 37. The data processing system as defined in Clause 36, wherein the consumer element is configured, when a currently executing task relinquishes use of the consumer element, and when a block of message data providing at least a part of a task definition for the consumer element has been received on the message channel, to switch to performing a new task defined by the task definition.

Clause 37. The data processing system as defined in Clause 36, wherein the consumer element is configured, when a block of message data providing at least a part of a task definition for the consumer element is received on the message channel, to pause execution of a currently executing task and to switch to performing a new task defined by the task definition.

Clause 38. The data processing system as defined in any of Clauses 1-37, the producer element is configured to reference memory locations using virtual addresses and comprises address translation circuitry to perform address translation of the virtual addresses into physical addresses, wherein the producer element is configured to map a virtual address associated with the message channel to a physical address associated with the message channel identifier, and wherein the producer element is configured to access the message channel by execution of a store instruction specifying the virtual address.

Clause 39. The data processing system as defined in Clause 38, wherein the execution of the store instruction comprises retrieval of the block of message data from a set of registers and storing the block of message data to the physical address associated with the message channel identifier.

Clause 40. The data processing system as defined in any of Clauses 1-39, wherein the system privileged agent comprises at least one of:

an operating system; and a hypervisor.

Clause 41. The data processing system as defined in any of Clauses 1-40, wherein the system privileged agent is responsive to a message channel setup call for the message channel from a processing element of the multiple processing elements to:

allocate the message channel identifier for the message channel;

specify the message channel target pointer;

wherein the processing element uses virtual addresses to reference memory locations, and allocate a virtual address for the processing element to use for the message channel, wherein the virtual address maps to a physical address given by the message channel target pointer.

Clause 42. The data processing system as defined in Clause 2, or any of Clauses 3-41 when dependent on Clause 2, wherein the system privileged agent is responsive to a message channel setup call for the message channel from a processing element of the multiple processing elements to:

allocate the message channel identifier for the message channel;

specify the message channel target pointer;

specify the message channel router pointer;

wherein the processing element uses virtual addresses to reference memory locations, and allocate a virtual address for the processing element to use for the message channel, wherein the virtual address maps to a physical address given by the message channel router pointer.

Clause 43. The data processing system as defined in Clause 42, wherein the system privileged agent is configured to define a virtual-to-physical address mapping scheme between a virtual address space and a physical address space in which a subset of bits of the physical address space are directly indicative of a set of message channel identifiers defined by the system privileged agent.

Clause 44. The data processing system as defined in any of Clauses 1-43, wherein at least one processing element of the multiple processing elements is configured to support execution of multiple tasks on the processing element, wherein each task has an individual set of processing element state, wherein the system privileged agent is configured to administer time-sliced use of the processing element by causing an exchange of the individual set of processing element state and by modifying at least one of the message channel identifier and the message channel target pointer.

Clause 45. The data processing system as defined in Clause 2, or any of Clauses 3-44 when dependent on Clause 2, comprising:

a plurality of router devices coupled to the interconnect circuitry, wherein at system start-up the system privileged agent is configured to map each of the plurality of router devices into a physical address space, and a proximity table is constructed comprising information indicative of a predefined cost function related to communication between each processing element of the multiple processing elements and each router device of the plurality of router device, wherein the system privileged agent is configured to define the message channel for communication between the producer element and a consumer element by:

selecting the router device associated with the message channel in dependence on the information comprised in the proximity table.

Clause 46. The data processing system as defined in Clause 45, wherein the router device is further selected to minimise a predefined cost function related to communication between the router device and the consumer element.

Clause 47. The data processing system as defined in Clause 46, wherein the predefined cost function is a measure of at least one of:

relative distance between the router device and the consumer element;

bandwidth between the router device and the consumer element; and/or signalling latency between the router device and the consumer element.

Clause 48. The data processing system as defined in Clause 46 or Clause 47, wherein the router device is further selected in dependence on a relative priority of the message channel.

Clause 49. The data processing system as defined in any of Clauses 46-48, wherein the system privileged agent is responsive to addition of a new router device to the data processing system whilst the data processing system is operating to re-construct the proximity table to incorporate the new router device.

Clause 50. A method of operating a data processing system comprising:

defining a configuration of the data processing system by a system privileged agent;

performing data processing in multiple processing elements, wherein the multiple processing elements comprise a producer element and a consumer element;

coupling the multiple processing elements with one another via interconnect circuitry;

defining a message channel for communication between the producer element and a consumer element, the message channel being defined by a message channel identifier and a message channel target pointer, wherein the message channel target pointer indicates a non-cacheable target location associated with the consumer element;

performing an atomic message store operation by the producer element with respect to a block of message data targeting the consumer element, wherein the producer element specifies the message channel identifier and the block of message data; and conveying the block of message data atomically to the non-cacheable target location associated with the consumer element via the interconnect circuitry.

In brief overall summary a message channel functionality for a data processing system is disclosed. This provides communication channels which may be considered to be a shared resource. The approach combines atomic stores, which are fully completed in a single atomic transaction, and non-coherence to provide non-coherent atomic stores that are conditional to implement primitive communications channels that can be used to implement software queues and channels more efficiently. This enables the programmer to execute a store from registers on one side of a communications link and to have that data appear in the registers of a data consumer on that link directly, bypassing both the shared state upgrade problem and the parallel problem of acquiring a synchronization lock before data send.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing system comprising:

multiple hardware processing elements arranged to perform data processing, wherein the multiple hardware processing elements comprise a hardware producer element and a hardware consumer element;

a system privileged agent arranged to run on one of the hardware multiple processing elements and to define a configuration of the data processing system; and interconnect circuitry arranged to couple the multiple hardware processing elements with one another, wherein the data processing system supports a message channel functionality according to which:

the system privileged agent is configured to define a message channel for communication between the hardware producer element and a hardware consumer element, the message channel being defined by a message channel identifier and a message channel target pointer, wherein the message channel target pointer indicates a non-cacheable target location associated with the hardware consumer element;

the hardware producer element is configured to perform an atomic message store operation with respect to a block of message data targeting the hardware consumer element, wherein the hardware producer element specifies the message channel identifier and the block of message data; and the interconnect circuitry is configured to convey the block of message data atomically to the non-cacheable target location associated with the hardware consumer element.

2. The data processing system as claimed in claim 1, wherein the data processing system further comprises:

a router device coupled to the interconnect circuitry and comprising an input port and an output port, wherein the system privileged agent is configured to define the message channel for communication between the hardware producer element and a hardware consumer element by:

providing the hardware producer element with a message channel router pointer indicative of the input port of the router device; and storing message channel configuration data in the router, the message channel configuration data comprising the message channel identifier and the message channel target pointer, wherein the hardware producer element is arranged to perform the atomic message store operation specifying the message channel router pointer, and wherein the router device is responsive to reception of the block of message data at the input port to forward the block of message data from the output port to the non-cacheable target location indicated by the message channel target pointer.

3. The data processing system as claimed in claim 2, wherein the multiple hardware processing elements comprise multiple hardware consumer elements, and wherein more than one hardware consumer elements subscribe to the message channel, wherein the message channel is associated with multiple message channel target pointers, wherein each of the message channel target pointers indicates a non-cacheable target location associated with a respective hardware consumer element of the multiple hardware consumer elements, and wherein the message channel configuration data stored in the router device comprises the message channel identifier and the multiple message channel target pointers.

4. The data processing system as claimed in claim 3, wherein the router device is responsive to reception of the block of message data at the input port to select a recipient hardware consumer element from the more than one hardware consumer elements which subscribe to the message channel and to forward the block of message data from the output port to the non-cacheable target location indicated by the message channel target pointer associated with the recipient hardware consumer element.

5. The data processing system as claimed in claim 4, wherein the router device is further responsive to the reception of the block of message data at the input port to re-forward the block of message data from the output port to each of the more than one hardware consumer elements which subscribe to the message channel.

6. The data processing system as claimed in claim 2, wherein the hardware consumer element is responsive to reception of the block of message data at the non-cacheable target location indicated by the message channel target pointer to return a success indicator to the router device, wherein the success indicator indicates whether or not the block of message data has been successfully received by the hardware consumer element, and the router device is responsive to reception of the success indicator to forward the success indicator to the hardware producer element.

7. The data processing system as claimed in claim 2, wherein the router device is responsive to the reception of the block of message data at the input port, when no hardware consumer element is available for the message channel, to return a message failure indication to the hardware producer element.

8. The data processing system as claimed in claim 2, comprising:

a plurality of router devices coupled to the interconnect circuitry and each comprising an input port and an output port, wherein the system privileged agent is configured to define the message channel for communication between the hardware producer element and a hardware consumer element by concatenating the plurality of router devices, such that:

the message channel router pointer specified by the hardware producer element specifies a first router device of the plurality of router devices, and the message channel configuration data stored in each of the plurality of router devices links the plurality of router devices in sequence, such that each router device of the plurality of router devices other than a last concatenated router device is responsive to reception of the block of message data at the input port to forward the block of message data from the output port to a next router device of the plurality of router devices, and the last concatenated router which is responsive to reception of the block of message data at the input port to forward the block of message data from the output port to the non-cacheable target location indicated by the message channel target pointer.

9. The data processing system as claimed in claim 1, wherein the system privileged agent is configured to define a router-less message channel for communication between the hardware producer element and a hardware consumer element by providing the hardware producer element with the message channel target pointer indicating the non-cacheable target location associated with the hardware consumer element, wherein the hardware producer element is arranged to perform the atomic message store operation specifying the message channel target pointer.

10. The data processing system as claimed in claim 1, wherein the hardware consumer element comprises a holding buffer accessible to user software executing on the hardware consumer element, wherein the non-cacheable target location associated with the hardware consumer element is configured as a data reception port of the hardware consumer element, and wherein the data reception port is configured to forward the block of message data received atomically to the holding buffer.

11. The data processing system as claimed in claim 10, wherein the holding buffer comprises at least one of:

a set of system registers;

vector registers;

user software addressable memory buffer; and a plurality of sub-buffers, wherein each sub-buffer of the plurality of sub-buffers is allocated to a corresponding message channel to which the hardware consumer element is subscribed.

12. The data processing system as claimed in claim 10, wherein the hardware consumer element is configured to reserve at least a portion of the holding buffer for at least one prioritised message channel to which the hardware consumer element is subscribed.

13. The data processing system as claimed in claim 10, wherein the user software executing on the hardware consumer element is configured to test whether the holding buffer currently holds a user software targeted block of message data on a message channel to which the user software is subscribed.

14. The data processing system as claimed in claim 10, wherein the hardware consumer element is configured to support execution of multiple tasks on the hardware consumer element, wherein each task has an individual set of consumer element state and the hardware consumer element is configured to switch to a corresponding individual set of consumer element state when switching to a current task of the multiple tasks.

15. The data processing system as claimed in claim 14, wherein the hardware consumer element is responsive to an attempt to deliver the block of message data at the data reception port, to receive or reject the block of message data in dependence on whether current task is subscribed to the message channel for the block of message data.

16. The data processing system as claimed in claim 14, wherein the data reception port is responsive to an attempt to deliver the block of message data at the data reception port, when the current task is not subscribed to the message channel for the block of message data, to generate an interrupt signal for the hardware consumer element.

17. The data processing system as claimed in claim 1, wherein the hardware consumer element comprises message channel handling circuitry comprising the non-cacheable target location, wherein the message channel handling circuitry is configured to reference message channels using message channel identifiers, wherein user software executing on the hardware consumer element is configured to reference the message channel using a virtual message channel identifier, and the hardware consumer element comprises message channel identifier translation circuitry configured to translate virtual message channel identifiers to message channel identifiers in dependence on user software currently executing on the hardware consumer element.

18. The data processing system as claimed in claim 1, wherein the system privileged agent comprises at least one of:

an operating system; and a hypervisor.

19. The data processing system as claimed in claim 1, wherein the system privileged agent is responsive to a message channel setup call for the message channel from a hardware processing element of the hardware multiple processing elements to:

allocate the message channel identifier for the message channel;

specify the message channel target pointer;

wherein the hardware processing element uses virtual addresses to reference memory locations, and allocate a virtual address for the hardware processing element to use for the message channel, wherein the virtual address maps to a physical address given by the message channel target pointer.

20. The data processing system as claimed in claim 2, wherein the system privileged agent is responsive to a message channel setup call for the message channel from a hardware processing element of the hardware multiple processing elements to:

allocate the message channel identifier for the message channel;

specify the message channel target pointer;

specify the message channel router pointer;

wherein the hardware processing element uses virtual addresses to reference memory locations; and allocate a virtual address for the hardware processing element to use for the message channel, wherein the virtual address maps to a physical address given by the message channel router pointer.

21. The data processing system as claimed in claim 20, wherein the system privileged agent is configured to define a virtual-to-physical address mapping scheme between a virtual address space and a physical address space in which a subset of bits of the physical address space are directly indicative of a set of message channel identifiers defined by the system privileged agent.

22. The data processing system as claimed in claim 1, wherein at least one hardware processing element of the hardware multiple processing elements is configured to support execution of multiple tasks on the hardware processing element, wherein each task has an individual set of processing element state, wherein the system privileged agent is configured to administer time-sliced use of the hardware processing element by causing an exchange of the individual set of processing element state and by modifying at least one of the message channel identifier and the message channel target pointer.

23. A method of operating a data processing system comprising:

performing data processing in hardware multiple processing elements, wherein the hardware multiple processing elements comprise a hardware producer element and a hardware consumer element;

defining a configuration of the data processing system by a system privileged agent running on one of the multiple hardware processing elements;

coupling the multiple hardware processing elements with one another via interconnect circuitry;

defining a message channel for communication between the hardware producer element and a hardware consumer element, the message channel being defined by a message channel identifier and a message channel target pointer, wherein the message channel target pointer indicates a non-cacheable target location associated with the hardware consumer element;

performing an atomic message store operation by the hardware producer element with respect to a block of message data targeting the hardware consumer element, wherein the hardware producer element specifies the message channel identifier and the block of message data; and conveying the block of message data atomically to the non-cacheable target location associated with the hardware consumer element via the interconnect circuitry.

* * * * *